US012412227B2

(12) United States Patent
Han et al.

(10) Patent No.: US 12,412,227 B2
(45) Date of Patent: Sep. 9, 2025

(54) ELECTRONIC APPARATUS AND CONTROL METHOD THEREOF

(71) Applicant: SAMSUNG ELECTRONICS CO., LTD., Suwon-si (KR)

(72) Inventors: Heungwoo Han, Suwon-si (KR); Seongmin Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 494 days.

(21) Appl. No.: 17/744,263

(22) Filed: May 13, 2022

(65) Prior Publication Data

US 2022/0270198 A1 Aug. 25, 2022

Related U.S. Application Data

(63) Continuation of application No. PCT/KR2021/014675, filed on Oct. 20, 2021.

(30) Foreign Application Priority Data

Oct. 20, 2020 (KR) ........................ 10-2020-0136308
Nov. 19, 2020 (KR) ........................ 10-2020-0155351

(51) Int. Cl.
*G06T 1/00* (2006.01)
*B25J 9/16* (2006.01)
(Continued)

(52) U.S. Cl.
CPC .......... *G06T 1/0014* (2013.01); *B25J 9/1697* (2013.01); *G06N 3/08* (2013.01); *G06T 7/20* (2013.01);
(Continued)

(58) Field of Classification Search
None
See application file for complete search history.

(56) References Cited

U.S. PATENT DOCUMENTS 8,346,392 B2    1/2013  Walser et al.
8,731,719 B2    5/2014  Franzius et al.
(Continued)

FOREIGN PATENT DOCUMENTS

CN    109531584 A    3/2019
CN    109559341 A    4/2019
(Continued)

OTHER PUBLICATIONS

Communication issued Jun. 29, 2023 by the European Patent Office in European Patent Application No. 21870570.5.
(Continued)

*Primary Examiner* — Truc M Do
(74) *Attorney, Agent, or Firm* — Sughrue Mion, PLLC

(57) ABSTRACT

An electronic apparatus includes a camera; a gripper configured to grip a grip target object; a memory configured to store a neural network model; and a processor configured to: obtain movement information and rotation information of the gripper by inputting at least one image captured by the camera to the neural network model, and control the gripper based on the movement information and the rotation information. The at least one image includes at least a part of the gripper and at least a part of the grip target object, and the neural network model is configured to output the movement information and the rotation information for positioning the gripper to be adjacent to the grip target object, based on the at least one image, the movement information includes one of a first direction movement, a second direction movement, or a movement stop of the gripper, and the rotation information includes one of a first direction rotation, a second direction rotation, or a non-rotation of the gripper.

21 Claims, 8 Drawing Sheets

(51) Int. Cl.
*G06N 3/08* (2023.01)
*G06T 7/20* (2017.01)
*G06T 7/50* (2017.01)
*H04N 23/90* (2023.01)

(52) U.S. Cl.
CPC .............. *G06T 7/50* (2017.01); *H04N 23/90* (2023.01); *G06T 2207/20081* (2013.01); *G06T 2207/20084* (2013.01)

(56) References Cited

U.S. PATENT DOCUMENTS

| | | |
|---|---|---|
| 10,109,055 B2 | 10/2018 | Xu et al. |
| 10,207,402 B2 | 2/2019 | Levine et al. |
| 11,034,018 B2 | 6/2021 | Kusano et al. |
| 2017/0252922 A1* | 9/2017 | Levine ................... G06N 3/045 |
| 2018/0085923 A1 | 3/2018 | Nammoto et al. |
| 2020/0061811 A1* | 2/2020 | Iqbal ........................ G06N 3/08 |
| 2020/0094406 A1 | 3/2020 | Kusano et al. |
| 2020/0164507 A1 | 5/2020 | Murase |
| 2020/0206913 A1 | 7/2020 | Kaehler |
| 2021/0270611 A1 | 9/2021 | Maehara et al. |
| 2021/0276182 A1 | 9/2021 | Kusano et al. |
| 2021/0365032 A1* | 11/2021 | Ichnowski .............. G06N 3/045 |

FOREIGN PATENT DOCUMENTS

| | | |
|---|---|---|
| CN | 110076772 A | 8/2019 |
| CN | 110298879 A | 10/2019 |
| CN | 111015655 A | 4/2020 |
| EP | 3 670 106 A1 | 6/2020 |
| JP | 6-203166 A | 7/1994 |
| JP | 2009-83095 A | 4/2009 |
| JP | 2011-507714 A | 3/2011 |
| JP | 5200772 B2 | 6/2013 |
| JP | 2018-205929 A | 12/2018 |
| JP | 2020-82322 A | 6/2020 |
| JP | 2020-90143 A | 6/2020 |
| KR | 10-2018-0114217 A | 10/2018 |

OTHER PUBLICATIONS

International Search Report and Written Opinion dated Feb. 3, 2022, issued by the International Searching Authority in counterpart International Application No. PCT/KR2021/014675 (PCT/ISA/210 and PCT/ISA/237).

Communication issued Feb. 21, 2025 by the European Patent Office in European Patent Application No. 21870570.5.

* cited by examiner

FIG. 4

|  |  | Output Class | | |
|---|---|---|---|---|
|  |  | + | − | 0 (Stop) |
| MOVEMENT INFORMATION | X-AXIS DIRECTION | 0.5 | 0.2 | 0.3 |
|  | Y-AXIS DIRECTION | 0.2 | 0.7 | 0.1 |
|  | Z-AXIS DIRECTION | 0.3 | 0.2 | 0.5 |
| ROTATION INFORMATION | ROTATION AROUND X AXIS | 0.7 | 0.1 | 0.2 |
|  | ROTATION AROUND Y AXIS | 0.1 | 0.8 | 0.1 |
|  | ROTATION AROUND Z AXIS | 0 | 0.1 | 0.9 |

OUTPUT OF NEURAL NETWORK MODEL

MOVEMENT INFORMATION:
(+) IN X-AXIS DIRECTION, (−) IN Y-AXIS DIRECTION, (0) IN Z-AXIS DIRECTION

ROTATION INFORMATION:
(+) AROUND X AXIS, (−) AROUND Y AXIS, (0) AROUND Z AXIS

| | Output Class | GT | GT Label | Network Output | Error |
|---|---|---|---|---|---|
| MOVEMENT OF GRIPPER | X move + | X: + | 1 | 0.2 | 0.8 |
| | - | | 0 | 0.3 | -0.3 |
| | 0 | | 0 | 0.1 | -0.1 |
| | Y move + | Y: - | 0 | 0.4 | -0.7 |
| | - | | 1 | 0.5 | 0.2 |
| | 0 | | 0 | 0.1 | -0.1 |
| | Z move + | Z: 0 | 0 | 0.3 | -0.3 |
| | - | | 0 | 0.2 | -0.2 |
| | 0 | | 1 | 0.7 | 0.3 |
| ROTATION OF GRIPPER | X rotation + | X: - | 0 | 0.5 | -0.5 |
| | - | | 1 | 0.2 | 0.8 |
| | 0 | | 0 | 0.1 | -0.1 |
| | Y rotation + | Y: 0 | 0 | 0.9 | -0.9 |
| | - | | 0 | 0.8 | -0.8 |
| | 0 | | 1 | 0.7 | 0.3 |
| | Z rotation + | Z: 0 | 0 | 0.7 | -0.7 |
| | - | | 0 | 0.4 | -0.4 |
| | 0 | | 1 | 0.5 | 0.5 |

ELECTRONIC APPARATUS AND CONTROL METHOD THEREOF

CROSS-REFERENCE TO RELATED APPLICATION(S)

This application is a bypass continuation of International Application No. PCT/KR2021/014675, filed on Oct. 20, 2021, which is based on and claims priority to Korean Patent Application No. 10-2020-0155351, filed on Nov. 19, 2020, and Korean Patent Application No. 10-2020-0136308, filed on Oct. 20, 2020, in the Korean Intellectual Property Office, the disclosures of which are incorporated by reference herein in their entireties.

BACKGROUND

1. Field

Apparatuses and methods consistent with the disclosure relate to an electronic apparatus and a control method thereof, and more particularly, to an electronic apparatus including a gripper, and a control method thereof.

2. Description of Related Art

In accordance with the recent development of an electronic technology, various types of electronic apparatuses have been developed and distributed.

In particular, robots for various purposes have been deployed in factories and homes. Such a robot may perform an operation of gripping an external object and moving or transporting the external object from one position to another position.

As an example, an industrial robot deployed in a factory may grip an object that is difficult for a person to grip and transport the object to a specific position or may perform assembling. As another example, a robot in a home may perform indoor cleaning, such as transporting foreign materials or may move an object that is difficult for a person to grip or a dangerous object to a specific position.

However, a related art robot might grip the object only when it correctly recognizes the object such as, for example, when it accurately recognizes a distance to the object, a shape of the object, or the like. It is very difficult to accurately recognize the distance to the object or the shape of the object, and there is a problem that an amount of calculation required for accurately recognizing the distance to the object or the shape of the object is large.

Accordingly, there is a need for a technology of gripping an object by efficiently positioning a gripper to be adjacent to the object without needing to accurately recognize the distance to the object, the shape of the object, or the like.

SUMMARY

Provided are an electronic apparatus of gripping an external object by efficiently controlling a gripper, and a control method thereof.

According to an aspect of the disclosure, an electronic apparatus may include a camera; a gripper configured to grip a grip target object; a memory configured to store a neural network model; and a processor configured to: obtain movement information and rotation information of the gripper from the neural network model by inputting at least one image captured by the camera to the neural network model, and control the gripper based on the movement information and the rotation information, wherein the at least one image includes at least a part of the gripper and at least a part of the grip target object, the neural network model is configured to output the movement information and the rotation information for positioning the gripper to be adjacent to the grip target object, based on the at least one image, the movement information includes one of a first direction movement, a second direction movement, or a movement stop of the gripper, and the rotation information includes one of a first direction rotation, a second direction rotation, or a non-rotation of the gripper.

An advantage of such an electronic apparatus comprising a gripper is that it allows a recognition of and movement towards a grip target object to be gripped with a classification model using a neuronal network model that predicts the relative position of the grip target object, making it possible to perform gripping of said grip target object accurately only with a low-cost sensor as a camera and without necessitating accurate 3D position information of the grip target object. Expressed in other words, the electronic apparatus presented herein does not need an expensive, separate sensor, as e.g. an IR depth sensor, a stereo sensor or another complex image sensor but merely a simple low-cost sensor as e.g. a simple camera, thereby substantially decreasing the total cost of the electronic apparatus while simultaneously maintaining a high precision of movement in a horizontal/vertical and rotational direction. Moreover, such an electronic apparatus provides an increased gripping accuracy.

The processor may control the gripper to grip the grip target object based on the movement information corresponding to the movement stop and the rotation information corresponding to the non-rotation. In such an embodiment, no separate gripping instruction needs to be given to the gripper, as the gripper may grip for the grip target object as soon as the movement information corresponds to the movement stop information and the rotation information corresponds to the non-rotation information. Hence, the grip operation may automatically be performed once the gripper is positioned correctly with regard to the position and orientation of the grip target object. The movement information output from the neural network model may include x-axis movement information, y-axis movement information, and z-axis movement information, the x-axis movement information may include one of a first direction movement of the gripper in an x-axis direction, a second direction movement of the gripper in the x-axis direction, or a movement stop of the gripper in the x-axis direction, the y-axis movement information may include one of a first direction movement of the gripper in a y-axis direction, a second direction movement of the gripper in the y-axis direction, or a movement stop of the gripper in the y-axis direction, and the z-axis movement information may include one of a first direction movement of the gripper in a z-axis direction, a second direction movement of the gripper in the z-axis direction, or a movement stop of the gripper in the z-axis direction. In such an embodiment, it is advantageously precisely determined by the neural network model for each of the x-, y- and z-axis whether, and if yes, in which linear direction the gripper has/is to be moved—forwards or backwards—to approach the grip target object (further) and/or to adjust the position and/or orientation of the gripper to the position and/or orientation of the grip target object to be gripped.

The rotation information output from the neural network model may include x-axis rotation information, y-axis rotation information, and z-axis rotation information, the x-axis rotation information may include one of a clockwise rotation of the gripper around an x axis, a counterclockwise rotation of the gripper around the x axis, or a non-rotation of the gripper around the x axis, the y-axis rotation information may include one of a clockwise rotation of the gripper around a y-axis, a counterclockwise rotation of the gripper around the y-axis, or a non-rotation of the gripper around the y-axis, and the z-axis rotation information may include one of a clockwise rotation of the gripper around a z-axis, a counterclockwise rotation of the gripper around the z-axis, or a non-rotation of the gripper around the z-axis. In such an embodiment, it is advantageously precisely determined by the neural network model for each of the x-, y- and z-axis whether, and if yes, in which rotational direction the gripper has/is to be rotated—clockwise or counter-clockwise—to approach the grip target object (further) and/or to adjust the position and/or orientation of the gripper to the position and/or orientation of the grip target object to be gripped.

The processor may be configured to control the gripper to grip the grip target object based on identifying that the gripper iterates a predetermined operation based on the movement information. In such an embodiment, the gripping instruction is tied to the recognition of a predetermined operation pattern that is based on obtained movement information, such that advantageously no additional location recognition of the grip target object needs to be carried out and no additional gripping instruction needs to be received.

The at least one image may include a first image and a second image. The processor may be configured to: obtain first movement information and first rotation information by inputting the first image and the second image to the neural network model, control the gripper based on the first movement information and the first rotation information, obtain second movement information and second rotation information by inputting a third image and a fourth image to the neural network model based on the third image and the fourth image being captured by the camera based on the gripper being controlled based on the first movement information and the first rotation information, and control the gripper based on the second movement information and the second rotation information. In such an embodiment, the gripper may advantageously be moved in a fluent and (cost-)efficient manner. Expressed differently, in such an embodiment, the processor may move and rotate the gripper based on the movement information and the rotation information output in real time or at a predetermined time interval by the neural network model to position the gripper to be adjacent to the grip target object. Thus, while a first movement of the gripper is carried out based on first movement information and first rotation information, a movement of the gripper may be adjusted—in the movement—carrying out a second movement that is based on second movement information and second rotation information.

Preferably, the first and second images include information from which a depth value is obtainable, wherein the processor does not obtain the depth value based on the first and second images but obtains movement information and rotation information in consideration of depth information through the neural network trained using only the first and second images as inputs of the neural network model.

In a moreover preferred embodiment, the movement of the gripper which is based on the first movement information and the first rotation information is carried out for a predetermined time and/or until a predetermined distance is reached.

Furthermore preferred, the movement of the gripper which is based on the first movement information and the first rotation information is carried out until a movement of the gripper which is based on the second movement information and the second rotation information received is triggered/initiated. The neural network model may be configured to: obtain a depth map based on the at least one image, and output the movement information and the rotation information based on the depth map. Using such neural network models, it is possible to approach the depth-position of a grip target object within an operating area/space of the gripper using merely at least one image captured by a simple low-cost camera. Hence, such neural network models enable a very cost-efficient and nevertheless precise localization of a grip target object within the operating area/space of a gripper.

The neural network model may be trained to output the movement information and the rotation information for positioning the gripper to be adjacent to an external object based on distance information between at least a part of the gripper and at least a part of the external object included in each of a plurality of training images. In such an embodiment, the neural network model advantageously does not need to predict consecutive numerical values with a regression model to determine the absolute and accurate position/distance of/from a grip target object, but instead may use a classification model, following a scheme of determining one of several choices, merely classifying the relative distance to a grip target object, e.g. as close, as far or as the same. With such classification models, learning of the neural network is eased and the performance of the neural network model is more easily secured.

The camera may include a plurality of cameras, and the plurality of cameras may be spaced apart from each other, and may be configured to photograph the grip target object at different angles. In such an embodiment, stereo vision is advantageously used by the electronic apparatus, allowing the abovementioned classification more precisely using images captured from multiple cameras from different angles.

Furthermore preferred, the camera is a stereo vision camera.

According to an aspect of the disclosure, a control method of an electronic apparatus including a neural network model may include obtaining movement information and rotation information of a gripper from the neural network model by inputting at least one image to the neural network model; and controlling the gripper based on the movement information and the rotation information, wherein the at least one image includes at least a part of the gripper and at least a part of a grip target object, the neural network model outputs the movement information and the rotation information for positioning the gripper to be adjacent to the grip target object, based on the at least one image.

The movement information includes one of a first direction movement, a second direction movement, or a movement stop of the gripper, and the rotation information includes one of a first direction rotation, a second direction rotation, or a non-rotation of the gripper. Such a method benefits from the advantages mentioned above for the electronic apparatus.

The control method may include controlling the gripper to grip the grip target object based on the movement information corresponding to the movement stop and the rotation information corresponding to the non-rotation. With such a method, no separate gripping instruction needs to be given to the gripper, as the gripper may grip for the grip target object as soon as the movement information corresponds to the movement stop information and the rotation information corresponds to the non-rotation information. Hence, the grip operation may automatically be performed once the gripper is positioned correctly with regard to the position and orientation of the grip target object.

The movement information output from the neural network model may include x-axis movement information, y-axis movement information, and z-axis movement information, the x-axis movement information may include one of a first direction movement of the gripper in an x-axis direction, a second direction movement of the gripper in the x-axis direction, or a movement stop of the gripper in the x-axis direction, the y-axis movement information may include one of a first direction movement of the gripper in a y-axis direction, a second direction movement of the gripper in the y-axis direction, or a movement stop of the gripper in the y-axis direction, and the z-axis movement information may include one of a first direction movement of the gripper in a z-axis direction, a second direction movement of the gripper in the z-axis direction, or a movement stop of the gripper in the z-axis direction. In such an embodiment of the method, it is advantageously precisely determined by the neural network model for each of the x-, y- and z-axis whether, and if yes, in which linear direction the gripper has/is to be moved—forwards or backwards—to approach the grip target object (further) and/or to adjust the position and/or orientation of the gripper to the position and/or orientation of the grip target object to be gripped.

The rotation information output from the neural network model may include x-axis rotation information, y-axis rotation information, and z-axis rotation information. The x-axis rotation information may include one of a clockwise rotation of the gripper around an x-axis, a counterclockwise rotation of the gripper around the x-axis, or a non-rotation of the gripper around the x axis, the y-axis rotation information may include one of a clockwise rotation of the gripper around a y-axis, a counterclockwise rotation of the gripper around the y-axis, or a non-rotation of the gripper around the y-axis, and the z-axis rotation information may include one of a clockwise rotation of the gripper around a z-axis, a counterclockwise rotation of the gripper around the z-axis, or a non-rotation of the gripper around the z-axis. In such an embodiment of the method, it is advantageously precisely determined by the neural network model for each of the x-, y- and z-axis whether, and if yes, in which rotational direction the gripper has/is to be rotated—clockwise or counter-clockwise—to approach the grip target object (further) and/or to adjust the position and/or orientation of the gripper to the position and/or orientation of the grip target object to be gripped.

The method may include controlling the gripper to grip the grip target object based on identifying that the gripper iterates a predetermined operation based on the movement information. In such an embodiment of the method, the gripping instruction is tied to the recognition of a predetermined operation pattern that is based on obtained movement information, such that advantageously no additional location recognition of the grip target object needs to be carried out and no additional gripping instruction needs to be received.

The at least one image may include a first image and a second image. The obtaining of the movement information and the rotation information may include obtaining first movement information and first rotation information by inputting the first image and the second image to the neural network model. The controlling of the gripper may include controlling the gripper based on the first movement information and the first rotation information. The control method may include obtaining second movement information and second rotation information by inputting a third image and a fourth image to the neural network model based on the third image and the fourth image being captured by a camera based on the gripper being controlled based on the first movement information and the first rotation information; and controlling the gripper based on the second movement information and the second rotation information. In such an embodiment of the method, the gripper may advantageously be moved in a fluent and (cost-)efficient manner without that expensive sensors are needed.

Preferably, merely the movement information and the rotation information outputted by the neural network model is used to control the gripper. Especially preferred, the electronic apparatus does not include any further sensors apart from the camera to obtain input data for the neural network model.

In a furthermore preferred embodiment, the movement information output by the neural network model only includes information on whether to move the gripper in the first or second direction or whether or not to stop the movement of the gripper or whether or not to maintain the gripper at a current position.

Preferably, the movement information output by the neural network model does not include information on how much to move the gripper, that is, a movement distance.

Preferably, the neural network model calculates a probability for a movement in a first direction along a specific axis, for a movement in a second direction along said specific axis, and for a movement stop along said specific axis respectively (i.e. three probabilities for the x-axis, the y-axis or the z-axis, respectively), said probabilities indicating how high the respective probability is that the respective movement or movement stop along said axis will move the gripper such that it is more adjacent to the grip target object.

Furthermore preferred, the highest probability is outputted as movement information for said specific axis by the neural network model.

Also according to a preferred embodiment, the neural network model calculates a probability for a rotation in a first direction around a specific axis, for a rotation in a second direction around said specific axis, and for a rotation stop around said specific axis respectively (i.e. three probabilities for the x-axis, the y-axis or the z-axis, respectively), said probabilities indicating how high the respective probability is that the respective rotation or rotation stop around said axis will move the gripper such that it is more adjacent to the grip target object.

Furthermore preferred, the highest probability is outputted as rotation information for said specific axis by the neural network model.

Preferably, the neural network model outputs the movement information including one of a first direction movement, a second direction movement, or a movement stop of the gripper and the rotation information including one of a first direction rotation, a second direction rotation, or a non-rotation of the gripper for positioning the gripper to be adjacent to the grip target object based on the at least one image.

According to an aspect of an example embodiment, a control method of an electronic apparatus may include obtaining, by a processor of the electronic apparatus and via a camera of the electronic apparatus, an image of an end effector of the electronic apparatus and an object to be gripped by the end effector; obtaining, by the processor and using a neural network model, movement information that identifies whether the end effector is to be moved in a first predetermined manner in at least one of one of an x-axis direction, a y-axis direction, or a z-axis direction, and rotation information that identifies whether the end effector is to be rotated in a second predetermined manner in at least one of one of the x-axis direction, the y-axis direction, or the z-axis direction, based on the image; and selectively moving or rotating the end effector based on the movement information and the rotation information.

The control method may include obtaining, by the processor and via the camera, a first image and a second image of the end effector and the object; obtaining, by the processor and using the neural network model, first movement information that identifies whether the end effector is to be moved in the first predetermined manner in at least one of the x-axis direction, the y-axis direction, or the z-axis direction, based on the first image and the second image; obtaining, by the processor and using the neural network model, first rotation information that identifies whether the end effector is to be rotated in the second predetermined manner in at least one of the x-axis direction, the y-axis direction, or the z-axis direction; controlling, by the processor, the end effector to move or rotate in the at least one of the x-axis direction, the y-axis direction, or the z-axis direction in the first predetermined manner or the second predetermined manner, based on the first movement information; obtaining, by the processor and via the camera, a third image and a fourth image of the end effector and the object based on controlling the end effector to move or rotate in the first predetermined manner or the second predetermined manner; obtaining, by the processor and using the neural network model, second movement information that identifies that the end effector is not to be moved in the x-axis direction, the y-axis direction, and the z-axis direction, based on the third image and the fourth image; obtaining, by the processor and using the neural network model, second rotation information that identifies that the end effector is not to be rotated in the x-axis direction, the y-axis direction, and the z-axis direction, based on the third image and the fourth image; and controlling, by the processor, the end effector to grip the object based on the second movement information and the second rotation information The first movement information does not include a distance to the object in any of the x-axis direction, the y-axis direction, or the z-axis direction The end effector may be a gripper, and the method may include controlling the end effector to grip the object.

According to one or more embodiments of the disclosure, the robot may be positioned adjacent to the external object by consuming a time as little as possible with a movement as little as possible in moving the gripper to grip the external object.

Additional aspects will be set forth in part in the description that follows and, in part, will be apparent from the description, or may be learned by practice of the presented embodiments of the disclosure.

BRIEF DESCRIPTION OF THE DRAWINGS

FIG. 4 is a view for describing movement information and rotation information according to an embodiment;

DETAILED DESCRIPTION

Figure 1:
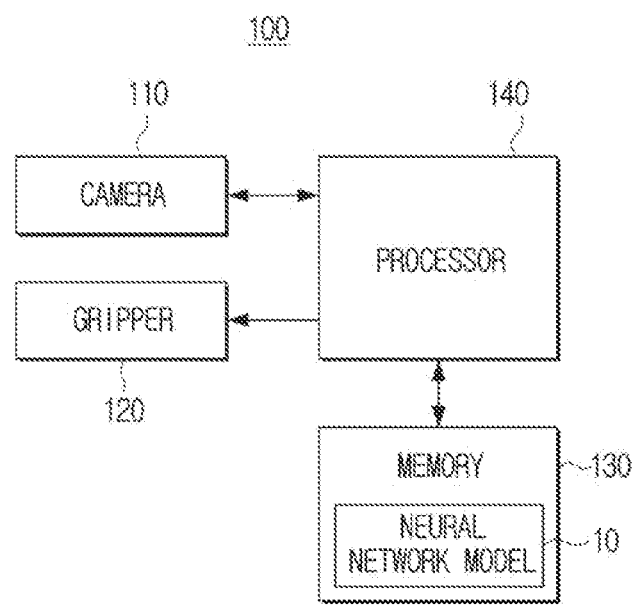
FIG. 1 is a block diagram illustrating components of an electronic apparatus according to an embodiment.

After terms used in the specification are schematically described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure are to be defined on the basis of the meaning of the terms and the contents throughout the disclosure rather than simple names of the terms.

Because the disclosure may be variously modified and have several embodiments, specific embodiments of the disclosure will be illustrated in the drawings and be described in detail in a detailed description. However, it is to be understood that the disclosure is not limited to specific embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Terms 'first', 'second', and the like, may be used to describe various components, but the components are not to be construed as being limited by these terms. The terms are used only to distinguish one component from another component.

Singular forms are intended to include plural forms unless the context clearly indicates otherwise. It should be understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In the disclosure, a "module" or a "~er/or" may perform at least one function or operation, and be implemented as hardware or software or be implemented as a combination of hardware and software. In addition, a plurality of "modules" or a plurality of "~ers/~ors" may be integrated in at least one module and be implemented as at least one processor (not illustrated) except for a "module" or a "~er/or" that needs to be implemented as specific hardware.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. In addition, in the drawings, portions unrelated to the description will be omitted to obviously describe the disclosure, and similar reference numerals will be used to describe similar portions throughout the specification.

FIG. 1 is a block diagram illustrating components of an electronic apparatus according to an embodiment of the disclosure.

As illustrated in FIG. 1, an electronic apparatus 100 according to an embodiment of the disclosure may be implemented as various types of devices such as a user equipment, a display device, a set-top box, a tablet personal computer (PC), a smartphone, an e-book reader, a desktop PC, a laptop PC, a workstation, server, a personal digital assistant (PDA), a portable multimedia player (PMP), an MP3 player, and a kiosk. However, this is an example, and the electronic apparatus 100 may be implemented as various types of electronic apparatuses such as a wearable device corresponding to at least one of an accessory-type device (e.g., a watch, a ring, a bracelet, an anklet, a necklace, glasses, a contact lens, or a head-mounted-device (HMD)) or a textile or clothing integral-type device (e.g., an electronic clothing), a robot including a driver, a projector, and a server.

The electronic apparatus 100 according to an embodiment of the disclosure may be implemented as a robot. Here, the robot may refer to various types of machines having an ability to perform a function by itself. As an example, the robot may refer to a smart machine that senses the surrounding environment in real time based on a sensor, a camera or the like, collects information, and operates autonomously, in addition to a simple repeated function.

The electronic apparatus 100 according to an embodiment of the disclosure may refer to a robot apparatus. Here, the robot apparatus may refer to various types of machines having an ability to perform a function by itself. As an example, the robot apparatus may refer to a smart machine that senses the surrounding environment in real time based on a sensor, a camera 110 or the like, collects information, and operates autonomously, in addition to a simple repeated function.

The electronic apparatus 100 includes a gripper 120 capable of gripping or moving an external object, such as a human finger. Meanwhile, the gripper 120 may also be referred to as a robot hand, which is a distal end portion of an articulated robot, but will hereinafter be correctively referred to as the gripper 120 for convenience of explanation.

Meanwhile, the electronic apparatus 100 may be divided into industrial, medical, home, military, and explorative robots according to its use field or its function that may be performed. According to an embodiment, the industrial robot may be subdivided into a robot used in a product manufacturing process in a factory, a robot performing customer reception, order reception, and serving in a store, a restaurant, etc., and the like. For example, the electronic apparatus 100 according to an embodiment of the disclosure may be implemented as a robot that may control the gripper 120 provided in a main body at various places such as factories, hotels, marts, hospitals, and clothing stores to grip an external object and then transport the external object to a specific position. However, this is only an example, and the robot may be variously classified according to a utilization field, a function, and use purpose, and is not limited to the example described above.

A conventional robot calculates a distance between an external object and a gripper as a specific numerical value based on a depth map of an image including the external object, moves the gripper based on the calculated distance, and then grips the external object. For example, the conventional robot may position the gripper to be adjacent to the external object only when position information of the external object (or distance information between the external object and the gripper) is obtained, and may control the gripper to grip the external object. Such a gripping method has a problem that the robot may smoothly grip the external object only when the distance between the external object and the gripper is approximately accurately calculated within an error range, and may not smoothly grip the external object or grips the external object after undergoing trial and error several times when the calculated distance is out of the error range. Here, the trial and error means that when the robot fails to grip the external object, the robot recalculates the distance between the external object and the gripper, moves the gripper based on the recalculated distance, and then grips the external object. Meanwhile, hereinafter, for convenience of explanation, the external object gripped by the electronic apparatus 100 through the gripper 120 will be collectively referred to as a grip target object.

The conventional robot calculates the distance between the grip target object and the gripper using a neural network model and then positions the gripper to be adjacent to the grip target object based on the calculated distance, whereas the electronic apparatus 100 according to an embodiment of the disclosure may classify a movement and a rotation of the gripper 120 into any one of at least three classes without calculating the distance between the gripper 120 and the grip target object. Then, the electronic apparatus 100 may move the gripper 120 or rotate the gripper 120 based on the classified class to position the gripper 120 adjacent to the grip target object. Hereinafter, a method of obtaining any one class for each of a movement and a rotation of the gripper 120 by the electronic apparatus 100 and a method of positioning the gripper 120 to be adjacent to a grip target object by the electronic apparatus 100 according to diverse embodiments of the disclosure will be described.

As illustrated in FIG. 1, the electronic apparatus 100 includes a camera 110, a gripper 120, a memory 130, and a processor 140.

The camera 110 is a component for capturing a still image or a moving image. The camera 110 may capture a still image at a specific point in time, but may also continuously capture a still image. The camera 110 according to an embodiment of the disclosure may provide an obtained image to the processor 140. According to an embodiment of the disclosure, a plurality of cameras 110 may be implemented.

The gripper 120 may be a device at an end of an arm the electronic apparatus, and may be configured to grip an object. For example, the gripper 120 may be an impactive gripper, an ingressive gripper, an astrictive gripper, a contiguitive gripper, or the like.

The memory 130 may be implemented as an internal memory such as a read-only memory (ROM) (e.g., an electrically erasable programmable read-only memory (EEPROM)), a random access memory (RAM), or the like, included in the processor 140 or be implemented as a memory separate from the processor 140. In this case, the memory 130 may be implemented in the form of a memory embedded in the electronic apparatus 100 or the form of a memory attachable to and detachable from the electronic apparatus 100, depending on a data storing purpose. For example, data for driving the electronic apparatus 100 may be stored in the memory embedded in the electronic apparatus 100, and data for an extension function of the electronic apparatus 100 may be stored in the memory attachable to and detachable from the electronic apparatus 100. Meanwhile, the memory embedded in the electronic apparatus 100 may be implemented as at least one of a volatile memory (e.g., a dynamic RAM (DRAM), a static RAM (SRAM), a synchronous dynamic RAM (SDRAM), or the like) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., an NAND flash, a NOR flash or the like), a hard drive, or a solid state drive (SSD)), and the memory attachable to and detachable from the electronic apparatus 100 may be implemented in the form of a memory card (e.g., a compact flash (CF), a secure digital (SD), a micro-SD, a mini-SD, an extreme digital (xD), a multi-media card (MMC), or the like), an external memory (e.g., a universal serial bus (USB) memory) connectable to a USB port, or the like.

In particular, the memory 130 stores a neural network model 10.

The processor 140 controls a general operation of the electronic apparatus 100.

According to an embodiment, the processor 140 may be implemented as a digital signal processor (DSP), a microprocessor, an artificial intelligence (AI) processor, or a time controller (T-CON) processing a digital video signal. However, the processor 140 is not limited thereto, and may include one or more of a central processing unit (CPU), a micro controller unit (MCU), a micro processing unit (MPU), a controller, an application processor (AP), a communication processor (CP), and an ARM processor, or may be defined by these terms. In addition, the processor 140 may be implemented as a system-on-chip (SoC) or a large scale integration (LSI) in which a processing algorithm is embedded or may be implemented in the form of a field programmable gate array (FPGA).

A function related to artificial intelligence according to the disclosure is operated through the processor 140 and the memory 130. The processor 140 may include one or more processors. In this case, one or more processors may be general-purpose processors such as a central processing unit (CPU), an application processor (AP), and a digital signal processor (DSP), graphics-dedicated processors such as a graphic processing unit (GPU) and a vision processing unit (VPU), or artificial intelligence-dedicated processors such as a neural processing unit (NPU). One or more processors perform control to process input data according to a predefined operation rule or artificial intelligence model stored in the memory 130. Alternatively, when one or more processors are the artificial intelligence-dedicated processors, the artificial intelligence-dedicated processors may be designed in a hardware structure specialized for processing a specific artificial intelligence model.

In particular, the processor 140 obtains movement information of the gripper 120 by inputting at least one image received through the camera 110 to the neural network model 10 stored in the memory 130. For example, the processor 140 may obtain movement information of the gripper 120 by inputting a first image and a second image to the neural network model 10.

Here, each of the first image and the second image may be different images including at least a part of the grip target object. For example, the first image and the second image may be images obtained by differently photographing the same grip target object, respectively. According to an embodiment, when the camera 110 is implemented as a stereo vision camera, the stereo vision camera may obtain a left-eye image and a right-eye image by differently photographing the same grip target object based on the same principle that different images are formed on a left eye and a right eye when both eyes of a person spaced apart from the same object by about 6.5 cm look at the same object. Here, the left-eye image and the right-eye image may be the first image and the second image, respectively.

As an example, the first image and the second image may be images obtained by photographing the same grip target object at different angles (or viewpoints) and in different ratios, respectively. As another example, the first image and the second image may be images obtained by photographing the same grip target object at different times, respectively.

In addition, the first and second images may further include at least a part of the gripper 120, in addition to the grip target object, respectively.

The processor 140 according to an embodiment of the disclosure may obtain movement information and rotation information for positioning the gripper 120 to be adjacent to the grip target object by inputting the first and second images to the neural network model 10.

However, this is an example, and the disclosure is not limited thereto. The processor 140 may input the first and second images to the neural network model 10 as described above and the neural network model 10 may output depth information and movement information and rotation information of the gripper 120 or the processor 140 may obtain depth information based on the first and second images, and obtain movement information and rotation information of the gripper 120 by inputting the obtained depth information to the neural network model 10.

Figure 2:
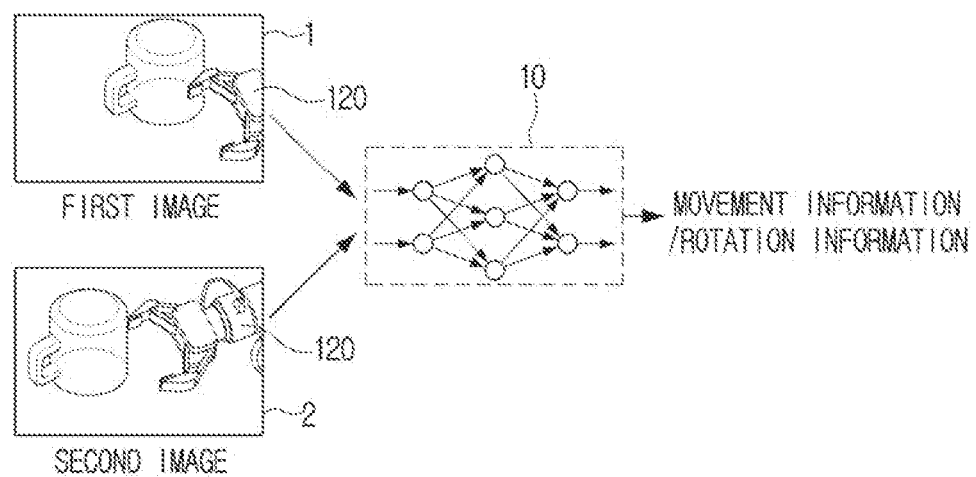
FIG. 2 is a view for describing a neural network model according to an embodiment.

FIG. 2 is a view for describing a neural network model 10 according to an embodiment of the disclosure.

The first and second images 1 and 2 will be described in more detail below with reference to FIG. 2. According to an embodiment, the camera 110 may include at least two cameras. For example, the camera 110 may be implemented as a stereo vision camera, and the processor 140 may obtain a depth of the grip target object using the first image 1 and the second image 2 in which binocular disparity characteristics that one grip target object is differently photographed through the stereo vision camera are reflected. Therefore, the first and second images 1 and 2 may include information from which a depth value may be obtained, and according to an embodiment of the disclosure, the processor 140 does not explicitly obtain the depth value based on the first and second images 1 and 2, and may obtain movement information and rotation information in consideration of depth information through the neural network model 10 trained using only the first and second images 1 and 2 as inputs of the neural network model 10.

The neural network model 10 according to an embodiment of the disclosure may be trained using only the first and second images 1 and 2 rather than the depth information as inputs. In this case, the neural network model 10 may obtain information (e.g., depth information) included in the first and second images 1 and 2, and adjust a weight corresponding to each of a plurality of layers configuring the neural network model 10 so that the depth information may be considered when outputting probability values of the plurality of layers, based on such information. A detailed content for this, that is, a training process of the neural network model 10 will be described later.

Meanwhile, the stereo vision camera may refer to the camera 110 obtaining the depth information (or distance information) of the grip target object based on at least two different images (e.g., the first and second images) obtained by photographing the grip target object at different angles using the same principle as the principle that a person looks at the external object three-dimensionally using a parallax between his/her left and right eyes.

The stereo vision camera may include a plurality of cameras disposed to be spaced apart from each other on the electronic apparatus 100, but is not limited thereto. For example, one camera 110 provided in the electronic apparatus 100 may be implemented in a manner of sequentially obtaining the first and second images 1 and 2 by photographing the grip target object at a first angle and then photographing the grip target object at a second angle.

According to an embodiment, the processor 140 may obtain movement information for moving the gripper 120 and rotation information for rotating the gripper 120 by inputting the first and second images 1 and 2 to the neural network model 10.

The processor 140 may move the gripper 120 in a first direction, move the gripper 120 in a second direction, or stop a movement of the gripper 120 based on the movement information.

In addition, the processor 140 may rotate the gripper 120 in the first direction, rotate the gripper 120 in the second direction, or does not rotate the gripper 120 based on the rotation information.

Figure 3:
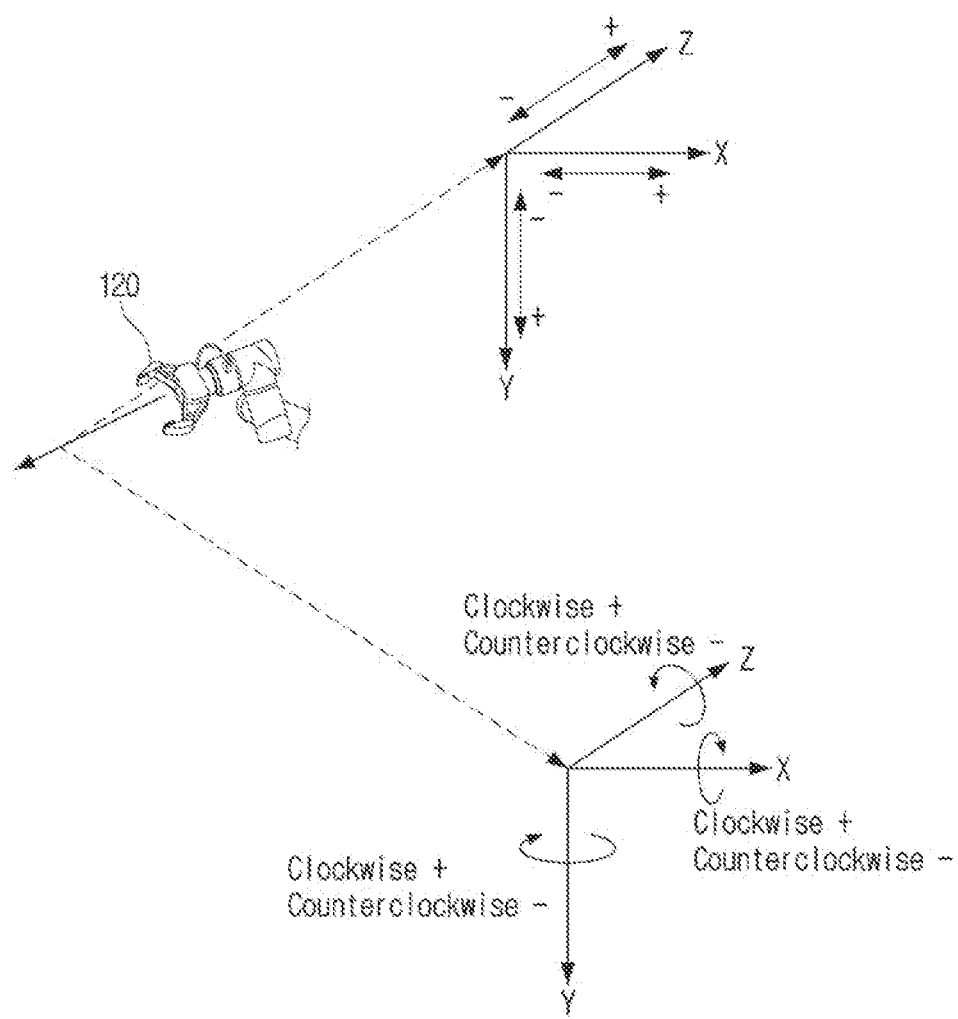
FIG. 3 is a view for schematically describing a movement and a rotation of a gripper according to an embodiment.

A detailed description for the movement information and the rotation information output by the neural network model 10 based on the first and second images 1 and 2 input to the neural network model 10 according to an embodiment will be provided with reference to FIG. 3.

FIG. 3 is a view for schematically describing a movement and a rotation of a gripper 120 according to an embodiment of the disclosure.

The neural network model 10 may output movement information including one of a first direction movement, a second direction movement, or a movement stop of the gripper 120 for positioning the gripper 120 to be adjacent to the grip target object based on the first and second images 1 and 2.

For example, the movement information may include x-axis movement information, y-axis movement information, and z-axis movement information.

The x-axis movement information according to an embodiment refers to horizontal movement information of the gripper 120. Specifically, the x-axis movement information may include one of a first direction movement (+), a second direction movement (−), or a movement stop in an x-axis direction. Here, the first direction movement in the x-axis direction may refer to a leftward movement of the gripper 120, the second direction movement in the x-axis direction may refer to a rightward movement of the gripper 120, and the movement stop may refer to maintaining the gripper 120 at a current position with respect to an x-axis.

The y-axis movement information according to an embodiment refers to vertical movement information of the gripper 120. Specifically, the y-axis movement information may include one of a first direction movement (+), a second direction movement (−), or a movement stop of the gripper 120 in a y-axis direction. Here, the first direction movement in the y-axis direction may refer to an upward movement of the gripper 120, the second direction movement in the y-axis direction may refer to a downward movement of the gripper 120, and the movement stop may refer to maintaining the gripper 120 at a current position with respect to a y-axis.

The z-axis movement information according to an embodiment refers to forward and rearward movement information of the gripper 120. Specifically, the z-axis movement information may include one of a first direction movement (+), a second direction movement (−), or a movement stop of the gripper 120 in a z-axis direction. Here, the first direction movement in the z-axis direction may refer to a forward movement of the gripper 120, the second direction movement in the z-axis direction may refer to a rearward movement of the gripper 120, and the movement stop may refer to maintaining the gripper 120 at a current position with respect to a z axis.

That is, the second direction may refer to a direction directly opposite to the first direction.

In addition, the neural network model 10 may output rotation information including one of a clockwise rotation (clockwise (+)), a counterclockwise rotation (counterclockwise (−)), or a non-rotation of the gripper 120 for positioning the gripper 120 to be adjacent to the grip target object based on the first and second images. The rotation information according to an embodiment may include x-axis rotation information, y-axis rotation information, and z-axis rotation information of the gripper 120.

Here, the x-axis rotation information may include one of a clockwise rotation (clockwise (+)) of the gripper 120 around the x-axis, a counterclockwise rotation (counterclockwise (−)) of the gripper 120 around the x-axis, or a non-rotation of the gripper 120 around the x-axis.

The y-axis rotation information may include one of a clockwise rotation (clockwise (+)) of the gripper 120 around the y-axis, a counterclockwise rotation (counterclockwise (−)) of the gripper 120 around the y-axis, or a non-rotation of the gripper 120 around the y-axis.

The z-axis rotation information may include one of a clockwise rotation (clockwise (+)) of the gripper 120 around the z-axis, a counterclockwise rotation (counterclockwise (−)) of the gripper 120 around the z-axis, or a non-rotation of the gripper 120 around the z-axis.

That is, the neural network model 10 does not output a concrete movement distance (movement amount) of the gripper 120 in a specific direction as the movement information, but may classify a movement of the gripper 120 into at least three classes for each of the three axes and outputs the classified classes as the movement information. Here, the at least three classes may correspond to the first direction movement (+), the second direction movement (−), and the movement stop, respectively.

That is, the neural network model 10 does not output a rotation angle (rotation amount) of the gripper 120 around a specific axis as the rotation information, but may classify a rotation of the gripper 120 into at least three classes for each of the three axes and outputs the classified classes as the rotation information. Here, at least three classes may correspond to the clockwise rotation (clockwise (+)), the counterclockwise rotation (counterclockwise (−)), and the non-rotation, respectively.

In this embodiment of the electronic apparatus 100, the gripper 120 is moveable in three dimensions, meaning that it is moveable along and rotatable around an x-axis, a y-axis and a z-axis.

However, also other embodiments of an electronic apparatus 100 may be realized in which the gripper 120 is moveable in only two or even only in one dimension, meaning that it is merely moveable along and/or rotatable around the x-axis and the y-axis, the x-axis and the z-axis or the y-axis and the z-axis or even merely moveable along and/or rotatable around the x-axis, the y-axis or the z-axis. Furthermore, in this embodiment, the movement and/or rotation of the gripper 120—for each axis—is classified by the neural network model 10 in three classes and outputted as movement/rotation information.

However, as mentioned, in other embodiments of the electronic apparatus, the movement and/or rotation of the gripper 120—for each axis—may also be classified by the neural network model 10 in more than three classes and outputted as movement/rotation information, e.g. in four, five, six, seven, eight, nine, ten or even more than ten classes. FIG. 4 is a view for describing movement information and rotation information according to an embodiment of the disclosure.

FIG. 4 is a view for describing movement information and rotation information according to an embodiment.

Referring to FIG. 4, when each of the first and second images 1 and 2 including at least a part of the gripper 120 and at least a part of the grip target object is input, the neural network model 10 may calculate a probability indicating that the gripper 120 may reach a position for gripping the grip target object when which of the first direction movement (+), the second direction movement (−), or the movement stop (0) is performed to position the gripper 120 to be adjacent to the grip target object.

As an example, the neural network model 10 may obtain each of a first probability that the gripper 120 will be positioned more adjacent to the grip target object at the time of moving in the first direction, a second probability that the gripper 120 will be positioned more adjacent to the grip target object at the time of moving in the second direction, and a third probability indicating whether or not the gripper 120 is positioned adjacent to the grip target object at a current position, based on the first and second images 1 and 2 obtained by photographing at least a part of the gripper 120 and at least a part of the grip target object at different angles.

Here, the sum of the first to third probabilities may be 1. Meanwhile, the meaning that the gripper 120 is positioned adjacent to the grip target object may be that the gripper 120 is positioned at a distance at which the gripper 120 may grip the grip target object at the time of performing a grip operation.

Then, the neural network model 10 may output a movement (or a movement stop) corresponding to the largest value of the first to third probabilities as the movement information. For example, when the first probability is the largest value, the neural network model 10 may output the first direction movement (+) corresponding to the first probability as the movement information.

Meanwhile, as described above, the movement information output by the neural network model 10 may include only information on whether to move the gripper 120 in the first or second direction or whether or not to stop the movement of the gripper 120 (or whether or not to maintain the gripper 120 at a current position), and may not include information on how much to move the gripper 120, that is, a movement distance.

In addition, when each of the first and second images of the gripper 120 is input, the neural network model 10 may calculate a probability indicating which of a clockwise rotation (clockwise (+)), a counterclockwise rotation (counterclockwise (−)), or a non-rotation around a specific axis should be performed to position the gripper 120 to be adjacent to the grip target object. As an example, the neural network model 10 may obtain each of a first probability that the gripper 120 will be positioned more adjacent to the grip target object at the time of rotating clockwise (clockwise (+)) around the x-axis, a second probability that the gripper 120 will be positioned more adjacent to the grip target object at the time of rotating counterclockwise (counterclockwise (−)) around the x-axis, and a third probability indicating that an angle of the gripper 120 with respect to the x-axis is positioned adjacent to the rotation grip target object and a clockwise or counterclockwise rotation of the gripper 120 is thus unnecessary. Here, the sum of the first to third probabilities may be 1. Meanwhile, the meaning that the gripper 120 is positioned adjacent to the grip target object may be that the gripper 120 is positioned at a distance at which the gripper 120 may grip the grip target object at the time of performing a grip operation.

Then, the neural network model 10 may output a rotation (or a non-rotation) corresponding to the largest value of the first to third probabilities as the rotation information. For example, when the second probability is the largest value, the neural network model 10 may output the counterclockwise rotation (counterclockwise (−)) corresponding to the second probability as the rotation information.

Then, the processor 140 may move (or stop moving) the gripper 120 and rotate (or does not rotate) the gripper 120 based on each of the movement information and the rotation information. Referring to FIG. 4, when the movement information includes a first direction movement in the x-axis direction, a second movement in the y-axis direction, and a movement stop in the z-axis direction, the processor 140 may move the gripper 120 in the first direction (e.g., a leftward direction) with respect to the x-axis, move the gripper 120 in the second direction (e.g., an upward direction) with respect to the y-axis, and stops the movement of the gripper 120 with respect to the z-axis, based on the movement information.

In addition, referring to FIG. 4, when the rotation information includes a clockwise rotation around the x-axis, a counterclockwise rotation around the y-axis, and a non-rotation around the z-axis, the processor 140 may rotate the gripper 120 clockwise around the x-axis, rotate the gripper 120 counterclockwise around the y-axis, and does not rotate the gripper 120 around the z-axis, based on the rotation information.

Meanwhile, specific probability numerals in FIG. 4 are only examples for convenience of explanation, and the neural network model 10 may output the movement information and the rotation information variously combined with each other based on the first and second images 1 and 2. Hereinafter, for convenience of explanation, the first direction and the clockwise direction will be indicated by (+), the second direction and the counterclockwise direction will be indicated by (−), and the movement stop and the non-rotation will be indicated by (0).

According to an embodiment of the disclosure, the processor 140 may move and rotate the gripper 120 based on the movement information and the rotation information. Then, the processor 140 may receive an image in real time or at a predetermined time interval through the camera 110, and obtain the next movement information and rotation information of the gripper 120 by inputting the received image to the neural network model.

Specifically, the processor 140 may obtain first movement information and first rotation information by inputting the first and second images 1 and 2 to the neural network model 10. For example, as illustrated in FIG. 4, the first movement information may include (+) in the x-axis direction, (−) in the y-axis direction, and (0) in the z-axis direction, and the first rotation information may include (+) around the x-axis, (−) around the y-axis, (0) around the z-axis.

Then, the processor 140 may obtain second movement information and second rotation information by inputting third and fourth images received through the camera 110 to the neural network model 10. Here, the third and fourth images may be images obtained by photographing the grip target object and the gripper 120 after a predetermined time from the first and second images. That is, each of the third and fourth images may include at least a part of the gripper 120 corresponding to a current position of the gripper 120 controlled (e.g., moved and rotated) according to the first movement information and the first rotation information.

Specifically, when the third and fourth images are received from the camera 110 while the processor 140 is controlling the movement of the gripper 120 as (+) in the x-axis direction, (−) in the y-axis direction, and (0) in the z-axis direction based on the first movement information and is controlling the rotation of the gripper 120 as (+) around the x-axis, (−) around the y-axis, (0) in the z-axis, the processor 140 may obtain the second movement information and the second rotation information by inputting the third and fourth images to the neural network model 10.

As another example, the processor 140 may move the gripper 120 as (+) in the x-axis direction, (−) in the y-axis direction, and (0) in the z-axis direction for a predetermined time based on the first movement information, and rotate the gripper 120 as (+) around the x-axis, (−) around the y-axis, (0) in the z-axis for a predetermined time based on the first rotation information. Then, when the third and fourth images including at least parts of the gripper 120 corresponding to a current position of the gripper 120 are received after the movement of the gripper 120 corresponding to the first movement information and the rotation of the gripper 120 corresponding to the first rotation information end as the predetermined time elapses, the processor 140 may obtain the second movement information and the second rotation information by inputting the third and fourth images to the neural network model 10.

Here, the third and fourth images may be images obtained by capturing at least a part of the gripper 120 and at least a part of the grip target object at different angles, respectively, after a predetermined time has elapsed since the camera 110 captured the first and second images 1 and 2. For example, the camera 110 may obtain a pair of images (e.g., the third and fourth images) at a time interval of 0.05 seconds and transmit the pair of images to the processor 140.

As an example, when the camera 110 is implemented as the stereo vision camera, the pair of images may include an image obtained by photographing at least a part of the gripper 120 and at least a part of the grip target object using any one of a plurality of cameras disposed to be spaced apart from each other and an image obtained by photographing at least a part of the gripper 120 and at least a part of the grip target object using the other of the plurality of cameras.

Meanwhile, 0.05 seconds is only an example, and the camera 110 may obtain the pair of images at a time internal relatively shorter or a time interval relatively longer than 0.05 seconds. For example, in other embodiments, the time interval may be 0.01 seconds, 0.02 seconds, 0.03 seconds, 0.04 seconds, 0.06 seconds, 0.07 seconds, 0.08 seconds, 0.09 seconds or 0.1 seconds. However, in other embodiments, the time interval may be even relatively shorter than 0.1 seconds or relatively longer than 0.1 seconds.

According to an embodiment, as the processor 140 moves and rotates the gripper 120 based on the first movement information and the first rotation information, respectively, a position of the gripper 120 included in the third image obtained after a predetermined time has elapsed from a point in time when the first image 1 is obtained may be different from a position of the gripper 120 included in the first image.

For example, when the processor 140 moves the gripper 120 for 0.05 seconds based on the first movement information, the position of the gripper 120 included in the third image will be different from the position of the gripper 120 included in the first image by "0.05 (s)*moving speed (m/s) of gripper 120".

A position of the gripper 120 included in the fourth image will be different from a position of the gripper 120 included in the second image 2 by "0.05 (s)*moving speed (m/s) of gripper 120".

Therefore, the neural network model 10 outputs the next movement information based on the current position of the gripper 120, and the second movement information corresponding to the third and fourth images output by the neural network model 10 may thus be the same as or different from the first movement information corresponding to the first and second images 1 and 2.

For example, the first movement information corresponding to the first and second images 1 and 2 may be (+) in the x-axis direction, (−) in the y-axis direction, and (0) in the z-axis direction, and the second movement information corresponding to the third and fourth images may be (0) in the x-axis direction, (+) in the y-axis direction, and (0) in the z-axis direction.

In addition, when the processor 140 rotates the gripper 120 for 0.05 seconds based on the first rotation information, an angle difference between the gripper 120 and the grip target object included in the third image with respect to a specific axis may be different from an angle difference between the gripper 120 and the grip target object included in the first image 1 with respect to the specific axis. An angle difference between the gripper 120 and the grip target object included in the fourth image with respect to the specific axis may also be different from an angle difference between the gripper 120 and the grip target object included in the second image 2 with respect to the specific axis.

Therefore, the neural network model 10 outputs the next (or new) rotation information based on the current position of the gripper 120, and the second rotation information corresponding to the third and fourth images may thus be the same as or different from the first rotation information corresponding to the first and second images 1 and 2.

For example, the first rotation information corresponding to the first and second images 1 and 2 may be (+) around the x-axis, (−) around the y-axis, and (0) around the z-axis, and the second rotation information corresponding to the third and fourth images may be (+) around the x-axis, (0) around the y-axis, and (0) around the z-axis.

That is, the neural network model 10 may output the movement information and the rotation information for positioning the gripper 120 to be adjacent to the grip target object in real time or at a predetermined time interval based on the image received in real time or at the predetermined time interval.

The neural network model 10 does not output specific numerical values corresponding to a movement distance, a rotation angle and the like of the gripper 120, but may output movement information and rotation information corresponding to the current position of the gripper 120 in real time or at a predetermined time interval. Therefore, the processor 140 may move and rotate the gripper 120 based on the movement information and the rotation information output in real time or at the predetermined time interval by the neural network model 10 to position the gripper 120 to be adjacent to the grip target object.

Figure 5:
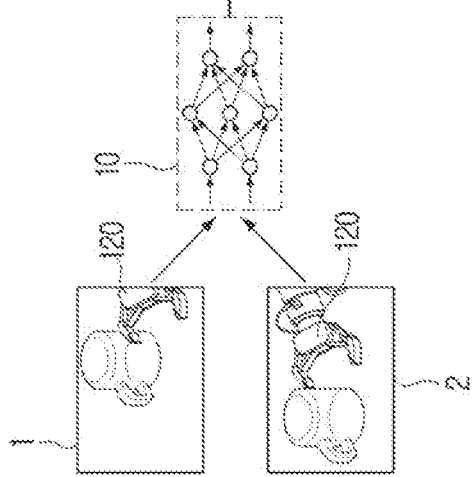
FIG. 5 is a view for describing training of the neural network model according to an embodiment.

FIG. 5 is a view for describing training of the neural network model 10 according to an embodiment of the disclosure.

<Training of Neural Network Model>

The neural network model 10 according to an embodiment of the disclosure is created through training to output movement information and rotation information for positioning the gripper 120 to be adjacent to an external object included in each of a plurality of training images.

Here, the creation through the training means that a predefined operation rule or artificial intelligence model set to perform a desired characteristic (or purpose) is created by training a basic artificial intelligence model using a plurality of training data by a training algorithm. Such training may be performed in an apparatus itself on which the artificial intelligence according to the disclosure is performed or may be performed through a separate server and/or system. Examples of the training algorithm include supervised training, unsupervised training, semi-supervised training, or reinforcement training, but are not limited thereto.

A neural network model trained by a supervised training algorithm according to an embodiment will be described. First, a method of obtaining training data of a neural network model will be described with reference to FIG. 5.

<Method of Obtaining Training Data of Neural Network Model>

First, a training data generating module (not illustrated) may obtain a stereo vision image by photographing movement of a gripper when a conventional rule-based robot or a conventional robot including a neural network model controls the gripper to grip an external object. Here, the stereo vision image may be an image including at least a part of the gripper provided in the conventional robot and at least a part of the external object and obtained by photographing movement of the gripper until the gripper moves and rotates to be positioned adjacent to the external object and then grips the external object. In addition, a plurality of frames configuring the stereo vision image may include different pairs of images, respectively. For example, each of the plurality of frames may include a pair of images obtained by photographing at least a part of the gripper and at least a part of the external object at the same time and at different angles. Here, each of the pairs of images may include a part of a gripper. At least a part of the gripper may refer to jaws or a finger portion in contact with the grip target object as a component of the gripper. Meanwhile, the training data generating module may refer to one function of the processor 140 or may refer to a processor generating training data provided in an external apparatus.

In addition, the training data generating module may obtain a control signal output by the conventional robot to move the gripper.

As an example, the training data generating module may obtain i) control signals for movement directions of the gripper with respect to each of the x-axis, the y-axis, and the z-axis or ii) control signals for rotation directions of the gripper around each of the x-axis, the y-axis, and the z-axis that are output by the conventional rule-based robot to move the gripper to be adjacent to the external object.

As another example, the training data generating module may obtain i) control signals for movement directions of the gripper with respect to each of the x-axis, the y-axis, and the z-axis or ii) control signals for rotation directions of the gripper around each of the x-axis, the y-axis, and the z axis that are output by the conventional robot including the neural network model to move the gripper to be adjacent to the external object. Alternatively, the training data generating module may obtain movement coordinate values of the gripper (and rotation angles of the gripper around each axis mapped to each movement coordinate value).

The training data generating module may obtain the obtained control signal or the movement coordinate values of the gripper and the rotation angles of each axis mapped to each movement coordinate value, and may obtain movement coordinate values of the gripper in a space and rotation angles of each axis mapped to each movement coordinate value from sensed data of a sensor.

The training data generating module may configure a plurality of obtained movement coordinate values and the rotation angles of each axis mapped to each movement coordinate value as gripper trajectory data, and the gripper trajectory data may be used as training data for training the movement of the gripper for gripping. Meanwhile, the gripper trajectory data may include only movement coordinate values in a space or may further include the rotation angles of each axis mapped to each movement coordinate value.

Here, the neural network model included in the conventional robot may be a model that calculates a distance between the gripper and the external object, and the conventional robot may be a robot that moves the gripper to be adjacent to the external object based on the calculated distance.

Then, the training data generating module may divide the stereo vision image obtained from the conventional robot in frame units and compare gripper trajectory data (coordinate values of the gripper in a space or rotation angles of each axis) mapped to an n−1-th image frame with gripper trajectory data mapped to an n-th image frame based on the gripper trajectory data to figure out in which direction the gripper has relatively moved, thereby matching a movement direction of the gripper with respect to the x-axis to any one of the first direction movement, the second direction movement, or the movement stop, matching a movement direction of the gripper with respect to the y-axis to any one of the first direction movement, the second direction movement, or the movement stop, and matching a movement direction of the gripper with respect to the z-axis to any one of the first direction movement, the second direction movement, or the movement stop.

The training data generating module may generate training data using the movement directions of the gripper with respect to each of the x-axis, the y-axis, and the z-axis corresponding to each of the plurality of frames as a ground truth.

As an example, referring to FIG. 5, the training data generating module may generate training data using 'x-axis (+), y-axis (−), z-axis (0)' as a ground truth for the movement directions of the gripper in a first frame when i) a movement direction of the gripper with respect to the x-axis in the first frame is the first direction, a movement direction of the gripper with respect to the y-axis in the first frame is the second direction, and a movement direction of the gripper with respect to the z-axis in the first frame is the movement stop, based on the control signals for the movement directions of the gripper with respect to each of the x-axis, the y-axis, and the z-axis. Here, the first frame may include different images (e.g., images captured at different angles) including at least a part of the gripper and at least a part of the grip target object as illustrated in FIG. 5.

In addition, the training data generating module may compare the gripper trajectory data (the coordinate values of the gripper in a space or the rotation angles of each axis) mapped to the n−1-th image frame with the gripper trajectory data mapped to the n-th image frame based on the gripper trajectory data to figure out in which direction the gripper has relatively rotated, thereby matching a rotation direction of the gripper around the x-axis to any one of a first direction rotation, a second direction rotation, or a non-rotation, matching a rotation direction of the gripper around the y-axis to any one of a first direction rotation, a second direction rotation, or a non-rotation, and matching a rotation direction of the gripper around the z-axis to any one of a first direction rotation, a second direction rotation, or a non-rotation.

The training data generating module may generate training data using the rotation directions of the gripper with respect to each of the x-axis, the y-axis, and the z-axis corresponding to each of the plurality of frames as a ground truth.

As an example, referring to FIG. 5, the training data generating module may generate training data using 'x-axis (−), y-axis (0), z-axis (0)' as a ground truth for the rotation directions of the gripper in the first frame when ii) a rotation direction of the gripper around the x-axis in the first frame is the second direction, a rotation direction of the gripper around the y-axis in the first frame is the non-rotation, and a rotation direction of the gripper around the z-axis in the first frame is the non-rotation, based on the control signals for the rotation directions of the gripper around each of the x-axis, the y-axis, and the z-axis. Meanwhile, it has been described above that the first direction has been expressed by (+), the second direction has been expressed by (−), and the movement stop or the non-rotation has been expressed by (0), for convenience of explanation.

Meanwhile, an example of generating the training data based on the image obtained by photographing the movement of the gripper when the conventional robot positions the gripper to be adjacent to the external object has been assumed and described hereinabove, but the disclosure is not limited thereto.

For example, the training data generating module may obtain an image obtained by attaching a sensor to a human arm or hand and photographing at least a part of the hand and at least a part of the external object. Then, the training data generating module may identify i) movement directions of each of an x-axis, a y-axis, and a z-axis of the human hand and ii) rotation directions of each of the x-axis, the y-axis, and the z-axis of the human hand based on sensed data received from the sensor. Then, the training data generating module may generate training data by matching the captured image to i) the movement directions of each of the x-axis, the y-axis, and the z-axis and ii) the rotation directions of each of the x-axis, the y-axis, and the z-axis.

<Method of Training Neural Network Model>

Referring to FIG. 5, when the conventional rule-based robot or the conventional robot including the neural network model controls the gripper to grip the external object, each of the plurality of frames configuring the stereo vision image obtained by photographing the movement of the gripper may be input training data of the neural network model.

As an example, a first frame of the plurality of frames configuring the stereo vision image may include a pair of images (e.g., the first and second images 1 and 2).

According to an embodiment, a neural network model 10 training module may input the pair of images (e.g., the first and second images 1 and 2) to the neural network model 10, and the neural network model 10 may output the movement information including one of the first direction movement, the second direction movement, or the movement stop of the gripper 120 and the rotation information including one of the first direction rotation, the second direction rotation, or the non-rotation of the gripper 120 for positioning the gripper 120 to be adjacent to the grip target object, based on at least a part of the external object and at least a part of the gripper 120 included in each of the pair of images that are input.

Referring to FIG. 5, the neural network model 10 may obtain each of a first probability that the gripper 120 will be positioned more adjacent to the grip target object at the time of moving in the first direction with respect to the x-axis, a second probability that the gripper 120 will be positioned more adjacent to the grip target object at the time of moving in the second direction with respect to the x-axis, and a third probability indicating whether or not the gripper 120 is positioned adjacent to the grip target object at a current position, based on the pair of images. Meanwhile, the sum of the first to third probabilities may not be 1.

Here, the neural network model 10 may obtain an error value based on an error between each of the first to third probabilities and the ground truth. Here, according to the ground truth, the movement direction of the gripper 120 corresponding to the pair of images may have a value of 1 (see GT label of FIG. 5), the remaining movement directions may have a value of 0, and each of the first to third probabilities (see Network Output of FIG. 5) output by the neural network model 10 based on the pair of images may have a value of 0 to 1. Accordingly, the error value (see Error of FIG. 5) may have a value of −1 to 1. That is, referring to FIG. 5, the error value may refer to a difference between a value of 1 corresponding to the GT label and a probability value corresponding to the Network Output.

The neural network model 10 training module according to an embodiment may adjust weights and parameters of hidden layers configuring the neural network model 10 to minimize the error value.

Further, in addition to the movement direction, also with respect to the rotation direction, the neural network model training module may obtain an error value based on an error between each of the first to third probabilities and the ground truth by the same method as the method described above, and train the neural network model 10 to minimize the error value. For example, the neural network model training module may search for an optimal weight based on a stochastic gradient descent, and may adjust weights of each of hidden layers based on the optimal weight.

Meanwhile, referring to FIG. 5, the neural network model 10 may output first to third probabilities corresponding to each of the x-axis, y-axis, and z-axis movement directions of the gripper 120, and first to third probabilities corresponding to each of the x-axis, y-axis, and z-axis rotation directions of the gripper 120, that is, a total of 18 probabilities, and the neural network model training module may obtain a total of 18 error values based on errors between each of the total 18 probabilities and the ground truth corresponding to each of the total 18 probabilities.

Hereinafter, a neural network model 10 trained by a reinforcement training algorithm according to another embodiment will be described.

The reinforcement training algorithm is an algorithm that trains the neural network model 10 to perform an optimal action in a current state, and gives a reward for an action whenever the action is performed. In particular, the neural network model training module may train the neural network model 10 to maximize the reward.

According to an embodiment of the disclosure, the neural network model 10 may output the movement information including one of the first direction movement, the second direction movement, or the movement stop of the gripper 120 and the rotation information including one of the first direction rotation, the second direction rotation, or the non-rotation of the gripper 120 for positioning the gripper 120 to be adjacent to the external object.

In this case, the reinforcement training algorithm may set a case where the gripper 120 is positioned more adjacent to the external object than before as a reward according to the movement information and the rotation information output by the neural network model 10. According to an embodiment, the neural network model training module may train the neural network model so that the gripper 120 is as adjacent to the external object as possible as a result of the movement of the gripper 120, that is, the reward becomes maximum, according to the movement information and the rotation information output by the neural network model 10.

In addition, the reinforcement training algorithm may set a case where the gripper 120 grips the external object and moves the external object by a predetermined distance as a reward. In this case, the neural network model training module may train the neural network model 10 so that the gripper 120 is positioned within a distance at which it may grip the external object and so that the gripper 120 is positioned within a distance at which it may stably grip the external object to move the external object by a predetermined distance or more according to the movement information and the rotation information output by the neural network model 10.

According to an embodiment, the reinforcement training algorithm may not provide the reward when the gripper 120 becomes more distant from the external object or fails to grip the external object as a result of the movement and the rotation of the gripper 120 according to the movement information and the rotation information output by the neural network model 10.

Meanwhile, the gripper 120 may perform any one of the first direction movement, the second direction movement, or the movement stop with respect to the x-axis, any one of the first direction movement, the second direction movement, or the movement stop with respect to the y-axis, and any one of the first direction movement, the second direction movement, or the movement stop with respect to the z-axis.

In addition, the gripper 120 may perform any one of the first direction rotation, the second direction rotation, the non-rotation around the x-axis, perform any one of the first direction rotation, the second direction rotation, the non-rotation around the y-axis, and perform any one of the first direction rotation, the second direction rotation, the non-rotation around the z-axis. That is, the number of cases of the movement of the gripper 120 may be 729 (3⁶) in total.

A neural network model training module according to another embodiment of the disclosure may train the neural network model 10 to output the movement information and the rotation information in consideration of the expected number of times of the movement finally required until the gripper 120 is positioned within a distance at which it may grip the external object and the number of cases of 729 in total for the movement of the gripper 120 when the gripper 120 is positioned adjacent to the external object, based on a current state of the gripper 120 (e.g., a level at which the gripper 120 is currently spaced apart from the grip target object) using deep Q-networks.

Meanwhile, the artificial intelligence model may include a plurality of neural network layers. Each of the plurality of neural network layers has a plurality of weight values, and performs a neural network operation through an operation between an operation result of the previous layer and the plurality of weights. The plurality of weights of the plurality of neural network layers may be optimized by a training result of the artificial intelligence model. For example, the plurality of weights may be updated so that a loss value or a cost value obtained from the artificial intelligence model during a training process is decreased or minimized. An artificial neural network may include a deep neural network (DNN), and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-Networks, and the like, and is not limited to the examples described above.

The conventional rule-based robot or the conventional robot including the neural network model calculates a distance between the gripper and the grip target object based on an image captured by the camera, and then moves the gripper based on the calculated distance. In this case, there is a limitation that it is very difficult for the robot to identify the distance between the gripper and the grip target object within an error range and the robot may smoothly grip the grip target object only when the distance between the gripper and the grip target object is identified within the error range (or only when reliability of the calculated distance is high).

On the other hand, the neural network model 10 according to an embodiment of the disclosure derives probability values (a higher probability value means that it corresponds to the most appropriate item to be selected to grip the grip target object in a current state of the gripper 120) corresponding to each of the three classes (e.g., the first direction movement, the second direction movement, and the movement stop) with respect to the movement directions of the gripper 120 with respect to each axis, and selects a class having the highest probability value as the movement direction. In addition, the neural network model 10 derives probability values (a higher probability value means that it corresponds to the most appropriate item to be selected to grip the grip target object in a current state of the gripper 120) corresponding to each of the three classes (e.g., the first direction rotation, the second direction rotation, and the non-rotation) with respect to the rotation directions of the gripper 120 around each axis, and selects a class having the highest probability value as the rotation direction.

Then, the processor 140 moves and rotates the gripper 120 based on the movement direction and the rotation information, and thus, it is not necessary to calculate a distance (e.g., a movement distance or a rotation angle) within an error range from the grip target object, and the gripper 120 may be positioned adjacent to the grip target object with less trial and error.

Figure 6:
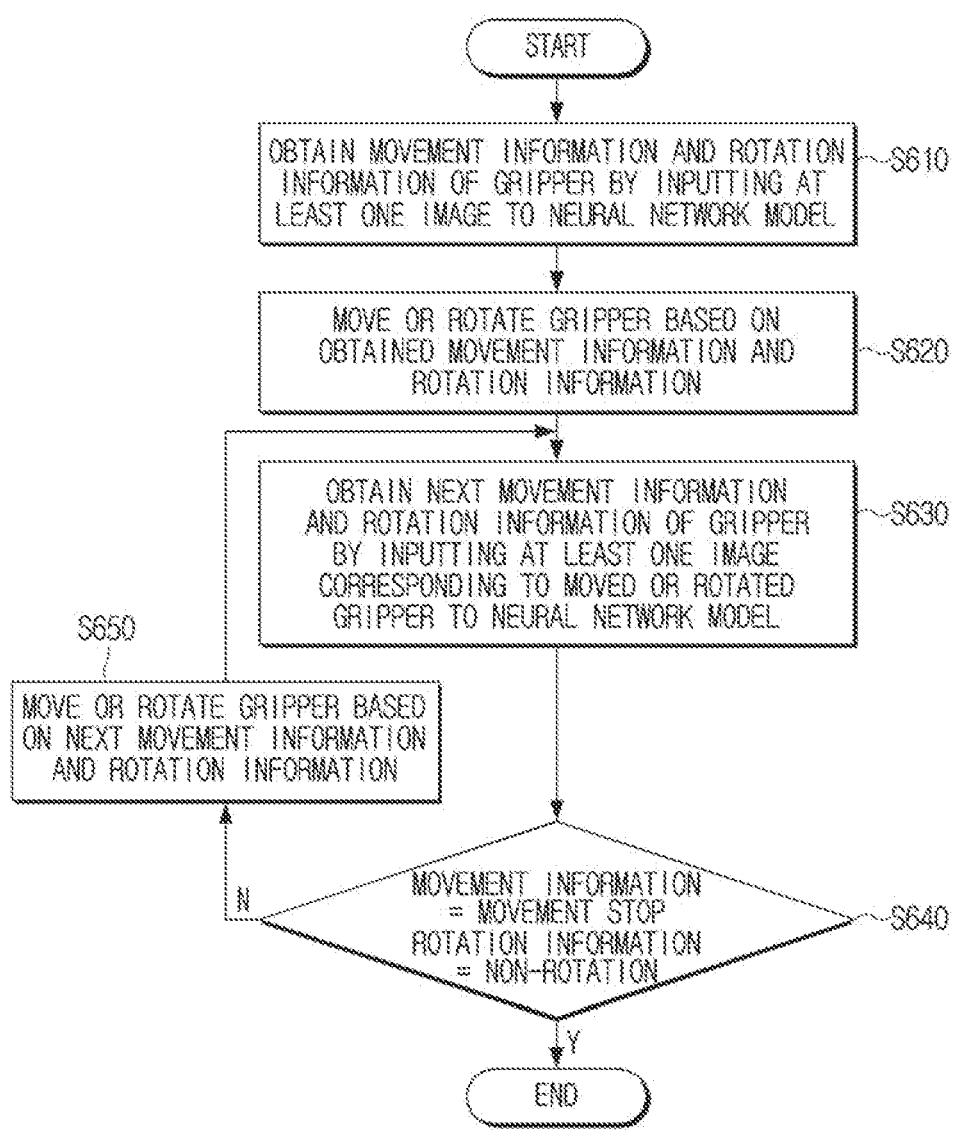
FIG. 6 is a flowchart for describing a control method of an electronic apparatus according to an embodiment.

FIG. 6 is a flowchart for describing a control method of an electronic apparatus 100 according to an embodiment of the disclosure.

First, the electronic apparatus 100 obtains the movement information and the rotation information of the gripper 120 by inputting at least one image to the neural network model 10 (S610). Here, it has been described above that at least one image may be a pair of images including at least a part of the gripper 120 and at least a part of the gripper 120 obtained through the stereo vision camera (point in time t).

Then, the electronic apparatus 100 moves and rotates the gripper 120 based on the obtained movement information and rotation information (S620). For example, the electronic apparatus 100 may move the gripper 120 in any one of the first direction or the second direction or stop the movement of the gripper 120 (e.g., fix the gripper 120 at a current position) based on the movement information.

In addition, the electronic apparatus 100 may rotate the gripper 120 in any one of the first direction or the second direction or does not rotate the gripper 120 (e.g., stop of the rotation of the gripper 120 when the gripper 120 is rotating) based on the rotation information. Here, it has been described above that the first direction may be the clockwise direction and the second direction may be the counterclockwise direction.

Then, the electronic apparatus 100 may obtain at least one image including at least a part of the gripper whose position is changed based on the movement information and the rotation information and at least a part of the grip target object (point in time t+1). For example, the electronic apparatus 100 may obtain an image in real time or at a predetermined time interval through the camera 110, and the obtained image may include a current state of the gripper 120 moved or rotated under the control of the processor 140 to have a changed position.

The electronic apparatus 100 may obtain the next (or new) movement information and rotation information of the gripper 120 by inputting at least one image to the neural network model (S630). Here, because the gripper 120 has moved or rotated in S620, the next movement information and rotation information may refer to movement information and rotation information corresponding to the current state of the gripper 120 whose position is changed.

Then, when the movement information obtained in S630 includes the movement stop (0) and the rotation information obtained in S630 includes the non-rotation (0) (S640: Y), the electronic apparatus 100 may stop the movement and the rotation of the gripper 120. As an example, when the movement information in all axes (x, y, and z-axes) includes movement stop (0) and rotation information in all axes (x, y, and z-axes) includes the non-rotation (0), it means that the gripper 120 is positioned within a distance at which it may grip the grip target object, and the electronic apparatus 100 may thus stop the movement and the rotation of the gripper 120 and control the gripper 120 to grip the grip target object.

As another example, when at least one information indicating the movement and the rotation of the gripper 120 among the movement information and the rotation information (e.g., six movement and rotation direction information corresponding to each of the x, y, and z-axes) obtained in S630 is obtained (S640: N), the electronic apparatus 100 may move and rotate the gripper 120 based on the movement information and the rotation information corresponding to three axes, obtained in S630 (S650). For example, when the movement information does not include the movement stop (0) or the rotation information does not include the non-rotation (0), it means that the gripper 120 is not positioned within the distance at which it may grip the grip target object, and the electronic apparatus 100 may thus move and rotate the gripper 120 to position the gripper 120 within the distance at which the gripper 120 may grip the grip target object.

Meanwhile, after S650, S630 and S640 may be iteratively performed.

<Iteration 1>

As an example, the electronic apparatus 100 my obtain at least one image including a current state of the gripper 120 moved and rotated according to movement information and rotation information obtained from the image obtained at the point in time t+1 (t+2), and obtain movement information and rotation information by inputting at least one image to the neural network model 10 (S630). Then, when the movement information obtained in Iteration 1 includes the movement stop (0) and the rotation information obtained in Iteration 1 includes the non-rotation (0) (S640: Y), the electronic apparatus 100 may stop the movement of the gripper 120 and grip the grip target object.

As another example, when at least one information indicating the movement and the rotation of the gripper 120 among the movement information and the rotation information (e.g., six movement and rotation direction information corresponding to each of the x, y, and z-axes) obtained in Iteration 1 is obtained (S640: N), the electronic apparatus 100 may move and rotate the gripper 120 based on the movement information and the rotation information obtained in Iteration 1 (i.e., the movement information and the rotation information obtained based on at least one image obtained at the point in time t+2).

Then, the electronic apparatus 100 may iteratively perform <Iteration 2>, that is, S630 and S640.

Meanwhile, when it is identified that the gripper 120 iterates a predetermined operation based on the movement information and the rotation information, the electronic apparatus 100 according to an embodiment of the disclosure may also control the gripper 120 to perform a grip operation on the grip target object. As an example, it is identified that the gripper 120 is alternately performing only a vertical movement, a horizontal movement, or a forward and backward movement in a state in which the gripper 120 is adjacent to the grip target object based on the movement information obtained in each of Iteration 1 and Iteration 2, the electronic apparatus 100 may determine that the gripper 120 is positioned at the distance at which it may grip the grip target object and control the gripper 120 to grip the grip target object.

As another example, it is identified that the gripper 120 is alternately performing only clockwise and counterclockwise rotations around the x-axis, clockwise and counterclockwise rotations around the y-axis, and clockwise and counterclockwise rotations around the z-axis in a state in which the gripper 120 is adjacent to the grip target object based on the rotation information obtained in each of Iteration 1 and Iteration 2, the electronic apparatus 100 may determine that the gripper 120 is positioned at the distance at which it may grip the grip target object and control the gripper 120 to grip the grip target object.

The control method may further include controlling the gripper 120 to perform a grip operation on the grip target object based on the movement information and the rotation information, wherein the movement information corresponds to a movement stop, and the rotation information corresponds to a non-rotation.

In addition, the movement information output from the neural network model 10 may include the x-axis movement information, the y-axis movement information, and the z-axis movement information, the x-axis movement information may include one of the first direction movement, the second direction movement, or the movement stop of the gripper 120 in the x-axis direction, the y-axis movement information may include one of the first direction movement, the second direction movement, or the movement stop of the gripper 120 in the y-axis direction, and the z-axis movement information may include one of the first direction movement, the second direction movement, or the movement stop of the gripper 120 in the z-axis direction.

In addition, the rotation information output from the neural network model 10 may include the x-axis rotation information, the y-axis rotation information, and the z-axis rotation information, the x-axis rotation information may include one of the clockwise rotation of the gripper 120 around the x-axis, the counterclockwise rotation of the gripper 120 around the x-axis, or the non-rotation of the gripper 120 around the x-axis, the y-axis rotation information may include one of the clockwise rotation of the gripper 120 around the y axis, the counterclockwise rotation of the gripper 120 around the y-axis, or the non-rotation of the gripper 120 around the y-axis, and the z-axis rotation information may include one of the clockwise rotation of the gripper 120 around the z-axis, the counterclockwise rotation of the gripper 120 around the z-axis, or the non-rotation of the gripper 120 around the z-axis.

The control method may further include controlling the gripper 120 to perform a grip operation on the grip target object when it is identified that the gripper 120 iterates a predetermined operation based on the obtained movement information.

In addition, at least one image may include the first and second images 1, 2, the obtaining of the movement information and the rotation information may include obtaining the first movement information and the first rotation information by inputting the first and second images 1, 2 to the neural network model 10, the controlling of the gripper 120 may include controlling the gripper 120 based on the first movement information and the first rotation information, and the control method may further include obtaining the second movement information and the second rotation information by inputting the third and fourth images to the neural network model 10 when the third and fourth images are received from the camera 110 while the gripper 120 is controlled based on the first movement information and the first rotation information; and controlling the gripper 120 based on the second movement information and the second rotation information.

In addition, the neural network model 10 may obtain the depth map based on at least one image, and may output the movement information and the rotation information based on the obtained depth map.

In addition, the neural network model 10 may be a model trained to output the movement information and the rotation information for positioning the gripper 120 to be adjacent to the external object based on the distance information between at least a part of the gripper 120 and at least a part of the external object included in each of the plurality of training images.

In addition, the electronic apparatus 10 may include the plurality of cameras disposed to be spaced apart from each other to photograph the grip target object at different angles.

Figure 7:
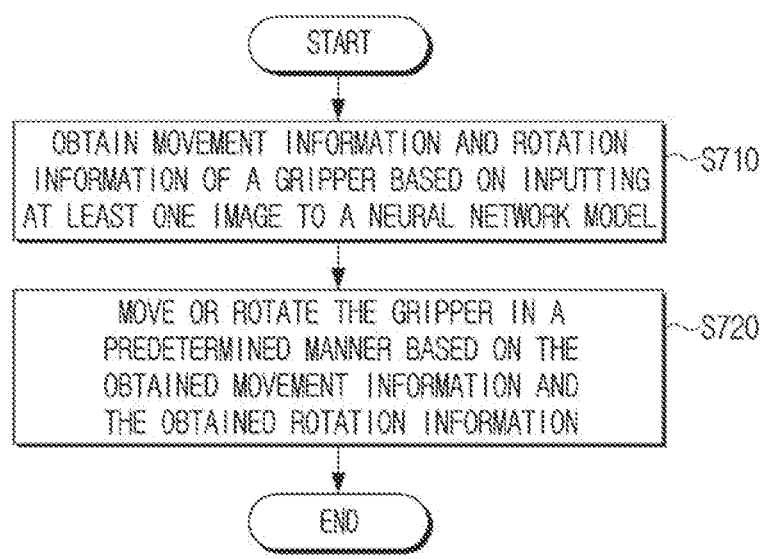
FIG. 7 is a flowchart for describing a control method of an electronic apparatus according to an embodiment.

FIG. 7 is a flowchart for describing a control method of an electronic apparatus according to an embodiment.

As shown in FIG. 7, the electronic apparatus 100 may obtain movement information and rotation information of a gripper based on inputting at least one image to a neural network model (operation S710). The electronic apparatus 100 may obtain the movement information and the rotation information in a substantially similar way as described above with respect to operation S610 of FIG. 6.

The electronic apparatus 100 may obtain movement information corresponding to n directions. For example, the electronic apparatus 100 may obtain movement information in a first direction (e.g., an x-axis direction), a second direction (e.g., a y-axis direction), and a third direction (e.g., a z-axis direction). As another example, the electronic apparatus 100 may obtain movement information for a different number of directions (e.g., only the x-axis direction, only the y-axis direction, the x-axis direction and the z-axis direction, etc.). Further, the electronic apparatus 100 may obtain rotation information corresponding to m directions. For example, the electronic apparatus 100 may obtain rotation information corresponding to a first axis (e.g., an x-axis), a second axis (e.g., a y-axis), and a third axis (e.g., a z-axis). As another example, the electronic apparatus 100 may obtain rotation information corresponding to a different number of directions (e.g., only the x-axis direction, only the y-axis direction, the x-axis direction and the z-axis direction, etc.).

As further shown in FIG. 7, the electronic apparatus 100 may move or rotate the gripper in a predetermined manner based on the obtained movement information and the obtained rotation information (operation S720).

The electronic apparatus 100 may move the gripper 120 or rotate the gripper 120 in the predetermined manner by moving the gripper 120 by a predetermined amount or rotating the gripper 120 by a predetermined amount. As an example, the predetermined amount may be a predetermined linear distance value or a predetermined angular distance value.

The movement information may be mapped to a predetermined amount or predetermined amounts. For example, movement information identifying that the gripper 120 is to be moved in the first direction may be mapped to a first predetermined amount in the first direction, movement information identifying that the gripper 120 is to be moved in the second direction may be mapped to a second predetermined amount in the second direction, and movement information identifying that the gripper 120 is to be moved in the third direction may be mapped to a third predetermined amount in the third direction. As another example, movement information identifying that the gripper 120 is to be rotated in the first direction may be mapped to a first predetermined amount in the first direction, movement information identifying that the gripper 120 is to be rotated in the second direction may be mapped to a second predetermined amount in the second direction, and movement information identifying that the gripper 120 is to be rotated in the third direction may be mapped to a third predetermined amount in the third direction.

The first predetermined amount, the second predetermined amount, and the third predetermined amount may be the same amount. Alternatively, the first predetermined amount, the second predetermined amount, and the third predetermined amount may be different amounts. Alternatively, at least one of the first predetermined amount, the second predetermined amount, and the third predetermined amount may be different with respect to another amount from among the first predetermined amount, the second predetermined amount, and the third predetermined amount.

The electronic apparatus 100 may move the gripper 120 or rotate the gripper 120 in the predetermined manner by moving the gripper 120 for a predetermined timeframe or rotating the gripper 120 for a predetermined time frame. As an example, the predetermined time frame may be a predetermined time value.

The movement information may be mapped to a predetermined timeframe or timeframes. For example, movement information identifying that the gripper 120 is to be moved in the first direction may be mapped to a first predetermined timeframe in the first direction, movement information identifying that the gripper 120 is to be moved in the second direction may be mapped to a second predetermined timeframe in the second direction, and movement information identifying that the gripper 120 is to be moved in the third direction may be mapped to a third predetermined timeframe in the third direction. As another example, movement information identifying that the gripper 120 is to be rotated in the first direction may be mapped to a first predetermined timeframe in the first direction, movement information identifying that the gripper 120 is to be rotated in the second direction may be mapped to a second predetermined timeframe in the second direction, and movement information identifying that the gripper 120 is to be rotated in the third direction may be mapped to a third predetermined timeframe in the third direction.

The first predetermined timeframe, the second predetermined timeframe, and the third predetermined timeframe may be the same timeframe. Alternatively, the first predetermined timeframe, the second predetermined timeframe, and the third predetermined timeframe may be different timeframes. Alternatively, at least one of the first predetermined timeframe, the second predetermined timeframe, and the third predetermined timeframe may be different with respect to another timeframe from among the first predetermined timeframe, the second predetermined timeframe, and the third predetermined timeframe.

In this way, the electronic apparatus 100 (e.g., the processor 140) moves and/or rotates the gripper 120 in a predetermined manner based on the obtained movement information and rotation information. Accordingly, the example embodiments of the present disclosure alleviate the need to calculate a specific distance (or specific distances) to the grip target object, thereby permitting movement and/or rotation of the gripper 120 in a way that consumes less computational resources and/or requires less accurate and/or robust hardware as compared to related art systems.

As described above, the movement information may identify a movement direction, and may be mapped to a predetermined amount or a predetermined timeframe. Further, as described above, the rotation information may identify a rotation direction, and may be mapped to a predetermined amount or a predetermined timeframe.

However, in another example, the movement information may identify a movement direction and a movement weight. Further, the movement weight may be mapped to a predetermined amount. For instance, a first movement weight of a first value (e.g., low) may be mapped to a first amount (e.g., a low amount), a movement weight of a second value (e.g., medium) may be mapped to a second amount (e.g., a medium amount that is greater than the low amount), etc. Similarly, the rotation information may identify a rotation direction and a rotation weight. Further, the rotation weight may be mapped to a predetermined amount. For instance, a first rotation weight of a first value (e.g., low) may be mapped to a first amount (e.g., a low amount), a rotation weight of a second value (e.g., medium) may be mapped to a second amount (e.g., a medium amount that is greater than the low amount), etc. It should be understood that the weights might not specify actual specific distances to the grip target object. In this way, the electronic apparatus 100 may position the gripper 120 adjacent to the grip target object using less iterations of obtaining movement information and rotation information and moving or rotating the gripper 120 as compared to situations where the electronic apparatus 100 moves or rotates the gripper 120 without the utilization of a weight.

Figure 8:
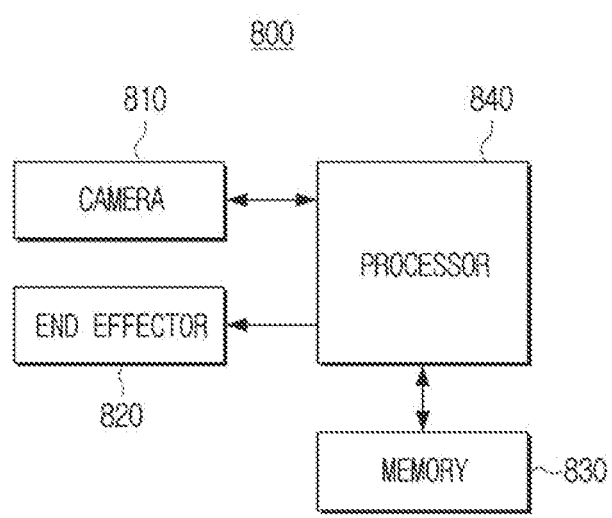
FIG. 8 is a block diagram illustrating components of an electronic apparatus according to an embodiment.

FIG. 8 is a block diagram illustrating components of an electronic apparatus according to an embodiment As illustrated in FIG. 8, the electronic apparatus 800 may include a sensor 810, an end effector 820, a memory 830, and a processor 840.

The sensor 810 may be a device that is configured to sense an object. For example, the sensor 810 may include a camera, a millimeter wave sensor, a laser sensor, a light detection and ranging (LIDAR) sensor, an ultrasonic sensor, a heat sensor, a light sensor, or the like. The sensor 810 may be configured to sense an object.

The end effector 820 may be a device that permits the electronic apparatus 800 to interact with the object. For example, the end effector 820 may be a gripper, a force-torque sensor, a material removal tool, a welding torch, a collision sensor, a tool changer, a sensor, or the like.

The memory 830 may be a memory device configured to store instructions. For example, the memory 830 may be a similar device as mentioned with respect to the memory 130 of FIG. 1.

The processor 840 is a device configured to control a general operation of the electronic apparatus 800. For example, the processor 840 may be a similar device as mentioned with respect to the processor 840 of FIG. 1.

The processor 840 may obtain sensor information from the sensor 810, and obtain movement information and/or rotation information, as described herein, based on the sensor information. Further, the processor 840 may move or rotate the end effector 820 in a predetermined manner, as described herein, based on the obtained movement information and/or rotation information, such that the end effector 820 is adjacent to the object.

The example embodiments described above may be implemented in a computer or an apparatus similar to the computer using software, hardware (e.g., a processor), or a combination of software and hardware. In some cases, embodiments described in the disclosure may be implemented as a processor itself. According to a software implementation, embodiments such as procedures and functions described in the specification may be implemented as separate software modules. Each of the software modules may perform one or more functions and operations described in the disclosure.

Computer instructions for performing processing operations of the electronic apparatus 100 according to the example embodiments described above may be stored in a non-transitory computer-readable medium. The computer instructions stored in the non-transitory computer-readable medium allow a specific apparatus to perform the processing operations in the electronic apparatus 100 according to the example embodiments described above when they are executed by a processor of the specific apparatus.

The non-transitory computer-readable medium may refer to a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a read only memory (ROM), and the like.

Although the embodiments have been illustrated and described hereinabove, the disclosure is not limited to the specific embodiments described above, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
   a camera;
   a gripper configured to grip a target object;
   a memory in which a neural network model is stored; and
   a processor configured to:
   obtain movement information and rotation information of the gripper from the neural network model by inputting at least one image, captured by the camera in real-time or at predetermined time intervals, to the neural network model, wherein the at least one image includes at least a part of the gripper and at least a part of the target object, and control the gripper based on the movement information and the rotation information output from the neural network model, wherein the neural network model is configured to, based on the at least one image, output the movement information and the rotation information for positioning the gripper to be adjacent to the target object, wherein the movement information output from the neural network model includes one of a first direction movement, a second direction movement, or a movement stop of the gripper without a movement amount of the gripper, and wherein the rotation information output from the neural network model includes one of a first direction rotation, a second direction rotation, or a non-rotation of the gripper without a rotation amount of the gripper.

2. The electronic apparatus as claimed in claim 1, wherein the processor is further configured to control the gripper to grip the target object based on the movement information corresponding to the movement stop and the rotation information corresponding to the non-rotation of the gripper.

3. The electronic apparatus as claimed in claim 1, wherein the movement information output from the neural network model includes x-axis movement information, y-axis movement information, and z-axis movement information, wherein the x-axis movement information includes one of a first direction movement of the gripper in an x-axis direction, a second direction movement of the gripper in the x-axis direction, or a movement stop of the gripper in the x-axis direction, wherein the y-axis movement information includes one of a first direction movement of the gripper in a y-axis direction, a second direction movement of the gripper in the y-axis direction, or a movement stop of the gripper in the y-axis direction, and wherein the z-axis movement information includes one of a first direction movement of the gripper in a z-axis direction, a second direction movement of the gripper in the z-axis direction, or a movement stop of the gripper in the z-axis direction.

4. The electronic apparatus as claimed in claim 1, wherein the rotation information output from the neural network model includes x-axis rotation information, y-axis rotation information, and z-axis rotation information, wherein the x-axis rotation information includes one of a clockwise rotation of the gripper around an x-axis, a counterclockwise rotation of the gripper around the x-axis, or a non-rotation of the gripper around the x-axis, wherein the y-axis rotation information includes one of a clockwise rotation of the gripper around a y-axis, a counterclockwise rotation of the gripper around the y-axis, or a non-rotation of the gripper around the y-axis, and wherein the z-axis rotation information includes one of a clockwise rotation of the gripper around a z-axis, a counterclockwise rotation of the gripper around the z-axis, or a non-rotation of the gripper around the z-axis.

5. The electronic apparatus as claimed in claim 1, wherein the processor is further configured to control the gripper to grip the target object based on identifying that the gripper iterates a predetermined operation based on the movement information.

6. The electronic apparatus as claimed in claim 1, wherein the at least one image includes a first image and a second image, and wherein the processor is further configured to:
obtain first movement information and first rotation information from the neural network model by inputting the first image and the second image to the neural network model, control the gripper based on the first movement information and the first rotation information, obtain second movement information and second rotation information from the neural network model by inputting a third image and a fourth image to the neural network model based on the third image and the fourth image being captured by the camera while the gripper is controlled based on the first movement information and the first rotation information, and control the gripper based on the second movement information and the second rotation information.

7. The electronic apparatus as claimed in claim 1, wherein the neural network model is further configured to:
obtain a depth map based on the at least one image, and
output the movement information and the rotation information based on the depth map.

8. The electronic apparatus as claimed in claim 1, wherein the neural network model is trained to output the movement information and the rotation information for positioning the gripper to be adjacent to an external object based on distance information between at least a part of the gripper and at least a part of the external object included in each of a plurality of training images.

9. The electronic apparatus as claimed in claim 1, wherein the camera includes a plurality of cameras, and wherein the plurality of cameras are spaced apart from each other, and are configured to photograph the target object at different angles.

10. A control method of an electronic apparatus including a neural network model, the control method comprising:
obtaining movement information and rotation information of a gripper from the neural network model by inputting at least one image, captured by a camera in real-time or at predetermined intervals, to the neural network model, wherein the at least one image includes at least a part of the gripper and at least a part of a target object; and controlling the gripper based on the movement information and the rotation information output from the neural network model, wherein the neural network model outputs, based on the at least one image, the movement information and the rotation information for positioning the gripper to be adjacent to the target object, wherein the movement information output from the neural network model includes one of a first direction movement, a second direction movement, or a movement stop of the gripper without a movement amount of the gripper, and wherein the rotation information output from the neural network model includes one of a first direction rotation, a second direction rotation, or a non-rotation of the gripper without a rotation amount of the gripper.

11. The control method as claimed in claim 10, further comprising controlling the gripper to grip the target object based on the movement information corresponding to the movement stop and the rotation information corresponding to the non-rotation.

12. The control method as claimed in claim 10, wherein the movement information output from the neural network model includes x-axis movement information, y-axis movement information, and z-axis movement information,
wherein the x-axis movement information includes one of a first direction movement of the gripper in an x-axis direction, a second direction movement of the gripper in the x-axis direction, or a movement stop of the gripper in the x-axis direction,
wherein the y-axis movement information includes one of a first direction movement of the gripper in a y-axis direction, a second direction movement of the gripper in the y-axis direction, or a movement stop of the gripper in the y-axis direction, and
wherein the z-axis movement information includes one of a first direction movement of the gripper in a z-axis direction, a second direction movement of the gripper in the z-axis direction, or a movement stop of the gripper in the z-axis direction.

13. The control method as claimed in claim 10, wherein the rotation information output from the neural network model includes x-axis rotation information, y-axis rotation information, and z-axis rotation information,
wherein the x-axis rotation information includes one of a clockwise rotation of the gripper around an x-axis, a counterclockwise rotation of the gripper around the x-axis, or a non-rotation of the gripper around the x-axis,
wherein the y-axis rotation information includes one of a clockwise rotation of the gripper around a y-axis, a counterclockwise rotation of the gripper around the y-axis, or a non-rotation of the gripper around the y-axis, and
wherein the z-axis rotation information includes one of a clockwise rotation of the gripper around a z-axis, a counterclockwise rotation of the gripper around the z-axis, or a non-rotation of the gripper around the z-axis.

14. The control method as claimed in claim 10, further comprising controlling the gripper to grip the target object based on identifying that the gripper iterates a predetermined operation based on the movement information.

15. The control method as claimed in claim 10, wherein the at least one image includes a first image and a second image,
wherein the obtaining of the movement information and the rotation information includes obtaining first movement information and first rotation information from the neural network model by inputting the first image and the second image to the neural network model,
wherein the controlling of the gripper includes controlling the gripper based on the first movement information and the first rotation information, and
wherein the control method further comprises:
obtaining second movement information and second rotation information from the neural network model by inputting a third image and a fourth image to the neural network model based on the third image and the fourth image being captured by the camera while the gripper is controlled based on the first movement information and the first rotation information; and
controlling the gripper based on the second movement information and the second rotation information.

16. A control method of an electronic apparatus, the control method comprising:
obtaining, by a processor of the electronic apparatus and via a camera of the electronic apparatus, an image of an end effector of the electronic apparatus and an object to be gripped by the end effector;
inputting, by the processor, the image into a neural network model to generate a depth map;
obtaining, by the processor from the neural network model, (i) movement information that identifies whether the end effector is to be moved in a first predetermined manner in at least one of one of an x-axis direction, a y-axis direction, or a z-axis direction, and (ii) rotation information that identifies whether the end effector is to be rotated in a second predetermined manner in at least one of one of the x-axis direction, the y-axis direction, or the z-axis direction; and
selectively moving or rotating the end effector based on the movement information and the rotation information,
wherein the movement information does not include a movement distance to the object in any of the x-axis direction, the y-axis direction, or the z-axis direction, and the rotation information does not include a rotation angle to the object in any of the x-axis direction, the y-axis direction, or the z-axis direction.

17. The control method of claim 16, further comprising:
obtaining, by the processor and via the camera, a first image and a second image of the end effector and the object;
obtaining, by the processor and using the neural network model, first movement information that identifies whether the end effector is to be moved in the first predetermined manner in at least one of the x-axis direction, the y-axis direction, or the z-axis direction, based on the first image and the second image;
obtaining, by the processor and using the neural network model, first rotation information that identifies whether the end effector is to be rotated in the second predetermined manner in at least one of the x-axis direction, the y-axis direction, or the z-axis direction;
controlling, by the processor, the end effector to move or rotate in the at least one of the x-axis direction, the y-axis direction, or the z-axis direction in the first predetermined manner or the second predetermined manner, based on the first movement information;
obtaining, by the processor and via the camera, a third image and a fourth image of the end effector and the object based on controlling the end effector to move or rotate in the first predetermined manner or the second predetermined manner;
obtaining, by the processor and using the neural network model, second movement information that identifies that the end effector is not to be moved in the x-axis direction, the y-axis direction, and the z-axis direction, based on the third image and the fourth image;
obtaining, by the processor and using the neural network model, second rotation information that identifies that the end effector is not to be rotated in the x-axis direction, the y-axis direction, and the z-axis direction, based on the third image and the fourth image; and
controlling, by the processor, the end effector to grip the object based on the second movement information and the second rotation information.

18. The control method of claim 17, wherein the first movement information does not include a distance to the object in any of the x-axis direction, the y-axis direction, or the z-axis direction.

19. The control method of claim 16, wherein the end effector is a gripper.

20. The control method of claim 16, further comprising: controlling the end effector to grip the object.

21. The electronic apparatus according to claim 1, wherein the neural network model is configured to output, as the movement information, a movement class selected from a plurality of movement classes corresponding to the first direction movement, the second direction movement, and the movement stop, and wherein the neural network model is configured to output, as the rotation information, a rotation class selected from a plurality of rotation classes corresponding to the first direction rotation, the second direction rotation, and the non-rotation.

* * * * *